US011830218B2

(12) United States Patent
Alcantarilla et al.

(10) Patent No.: US 11,830,218 B2
(45) Date of Patent: Nov. 28, 2023

(54) VISUAL-INERTIAL LOCALISATION IN AN EXISTING MAP

(71) Applicant: SLAMcore Limited, Oakham (GB)

(72) Inventors: Pablo Alcantarilla, Oakham (GB); Alexandre Morgand, Oakham (GB); Maxime Boucher, Oakham (GB)

(73) Assignee: SLAMcore Limited, Barleythorpe (GB)

(*) Notice: Subject to any disclaimer, the term of this patent is extended or adjusted under 35 U.S.C. 154(b) by 0 days.

(21) Appl. No.: 17/995,195

(22) PCT Filed: Oct. 15, 2021

(86) PCT No.: PCT/EP2021/078643
§ 371 (c)(1),
(2) Date: Sep. 30, 2022

(87) PCT Pub. No.: WO2022/079258
PCT Pub. Date: Apr. 21, 2022

(65) Prior Publication Data
US 2023/0117498 A1    Apr. 20, 2023

(30) Foreign Application Priority Data

Oct. 16, 2020 (GB) .................................. 2016444
Oct. 16, 2020 (GB) .................................. 2016445

(51) Int. Cl.
*G06T 7/73* (2017.01)
*G06V 10/74* (2022.01)
(Continued)

(52) U.S. Cl.
CPC ............... *G06T 7/73* (2017.01); *G06T 17/05* (2013.01); *G06V 10/44* (2022.01); *G06V 10/761* (2022.01);
(Continued)

(58) Field of Classification Search
CPC .......... G06T 7/20; G06T 7/246; G06T 7/248; G06T 7/70; G06T 7/73; G06T 7/74;
(Continued)

(56) References Cited

U.S. PATENT DOCUMENTS

| 2015/0103183 A1* | 4/2015 | Abbott et al. ............ G06T 7/74 348/169 |
| 2017/0249752 A1 | 8/2017 | Kotake |
| 2019/0220991 A1* | 7/2019 | Holzer et al. ........ G06F 16/5838 |

FOREIGN PATENT DOCUMENTS

CN      107818592 A   *   3/2018   .......... G01C 21/005

OTHER PUBLICATIONS

Tiefenbacher et al., "Sensor Fusion for Sparce SLAM with Descriptor Pooling", ECCV 2016 Workshops, Part III, LNCS 9915, pp. 698-710. (Year: 2016).*

(Continued)

*Primary Examiner* — Andrew W Johns
(74) *Attorney, Agent, or Firm* — Kilpatrick Townsend & Stockton LLP

(57) ABSTRACT

Provided are a mobile device (100) and computer-implemented method (700) for localisation in an existing map of a 3-D environment. For a first image frame, a first pose is localised based on visual features. For a second image frame, a pose is predicted (810) based on inertial measurements, combined with the pose of the first image frame. Based on the predicted pose, the method predicts (830) a set of landmarks that are likely to be visible. A second pose is then calculated (850), for the second image frame, based on matching (840) visual features of the second image frame to the set of landmarks.

22 Claims, 13 Drawing Sheets

(51) Int. Cl.
*G06V 10/44* (2022.01)
*G06T 17/05* (2011.01)
(52) U.S. Cl.
CPC .............. *G06T 2207/20016* (2013.01); *G06V 2201/07* (2022.01)
(58) Field of Classification Search
CPC .......... G06T 2207/30244; G06V 10/44; G06V 10/443; G06V 10/74; G06V 10/761; G05D 1/0231; G05D 1/0246
See application file for complete search history.

(56) References Cited

OTHER PUBLICATIONS

Leutenegger et al.; "Keyframe-based visual-inertial odometry using nonlinear optimization," International Journal of Robotics Research, vol. 34, 10-22 Y: 2014, , pp. 314-334.
Ringdahl, Viktor: "Stereo Camera Pose Estimation to Enable Loop Detection", MSC Thesis, Feb. 11, 2019.
Alcantarilla et al: "Visibility learning in large-scale urban environment", Robotics and Automation (ICRA), 2011 IEEE International Conference On, IEEE, May 9, 2011 (May 9, 2011), pp. 6205-6212.
GB 2016444.8; Search Report; dated Jun. 25, 2021; 4 pages.
GB 2016444.8; Examination Report; dated Sep. 15, 2021; 3 pages.
GB 2016444.8; Intention to Grant; dated Aug. 4, 2022; 2 pages.
GB 2016444.8; Notification of Grant; dated Sep. 20, 2022; 2 pages.
PCT/EP2021/078643; International Search Report and Written Opinion; dated Jan. 28, 2022; 21 pages.

\* cited by examiner

VISUAL-INERTIAL LOCALISATION IN AN EXISTING MAP

FIELD OF THE INVENTION

This invention relates to localisation, meaning the estimation of the pose of a mobile device in a 3-D environment. It relates in particular to visual-inertial localisation, in which visual data and inertial measurements are combined in the pose estimation process.

BACKGROUND OF THE INVENTION

Visual-inertial systems for simultaneous localisation and mapping (SLAM) are known in the art. These systems combine an inertial measurement unit (IMU) and a camera. The IMU provides one or more of accelerometer, gyroscope and compass measurements; and the camera provides visual input, in the form of a sequence of images. These may be either monocular images, stereo image-pairs, or a set of images from a multi-camera rig.

The mobile device comprising the camera and IMU may be handheld or mounted on a vehicle or robot moving through an environment. The goals of the system are two-fold: to localise—that is, estimate the position and orientation ("pose") of the camera—and also to create a map of the environment through which the camera is moving.

Most of the visual inertial SLAM systems known in the art are research systems disclosed in the academic literature. Typically, such systems consider a single SLAM session—initialising the system at an unknown location in an unknown environment, mapping (and localising) as the device moves around the environment, and then deleting all data at the end of the session.

SUMMARY OF THE INVENTION

A more practical use case, for a system in the real world, would involve reusing a map that was generated in a previous session, to avoid having to re-map the environment in every session. Examples according to the present invention provide such a system—enabling localisation based on a pre-existing map, (for example, one generated by the same device in a previous session, or generated by some other device which has entered the environment ahead of the device reusing the map).

It would be desirable to reuse the existing map (which may contain a large amount of data) in a computationally efficient manner, such that it can be implemented with limited processing resources, optionally in real time and optionally on-board the device itself.

The invention is defined by the claims.

According to an aspect there is provided a computer-implemented method for localisation of a mobile device in an existing map of a 3-D environment, based on visual and inertial data generated at the mobile device, the method comprising:

obtaining the existing map, the map comprising a set of keyframes characterising the environment, each keyframe having associated with it a plurality of landmarks, each landmark being a detected visual feature that is present in two or more keyframes and each landmark defining a 3-D position for the respective visual feature;

obtaining the visual data, comprising a series of image frames captured by a camera of the mobile device;

obtaining the inertial data, comprising at least one or any combination of two or more of: accelerometer, gyroscope and compass measurements;

extracting visual features from each image frame in the series of image frames;

for a first image frame in the series of image frames, localising a respective first pose of the mobile device, comprising comparing the extracted visual features of the first image frame with the landmarks associated with the keyframes;

for a second, later image frame in the series of image frames:

calculating a predicted pose based on the first pose and the inertial data, based on the predicted pose, predicting a subset of the landmarks that are likely to be visible in the second image frame, matching the extracted visual features of the second image frame with the predicted subset of landmarks, to identify matched visual features; and calculating the second pose of the mobile device associated with the second image frame based on the matched visual features and the respective landmarks.

This approach uses visual information to initialise the pose at the start of the session, when the inertial data is not yet calibrated to the map. The inertial data provides incremental, differential information that is reliable only over a relatively short time-span. At the start of a session, there is no frame of reference for these differential measurements; therefore, there is not yet any way to calibrate the inertial data to the map. However, once the pose has been initialised based on the visual information, the inertial data may be used to provide additional guidance for the pose estimates (for example, by integrating the inertial data starting from the first pose). The method therefore exploits the inertial data to guide the estimation of pose for subsequent frames. By using the predicted pose to predict the landmarks that are likely to be visible, the method can reduce the computational effort needed to refine the predicted pose based on visual information. Alternatively or in addition, it can improve the accuracy of the pose estimation, for a given amount of computational effort.

A pose generally comprises a position and an orientation associated with the mobile device. Since the camera and inertial measurement unit are generally rigidly mounted to the mobile device, the position and orientation of the mobile device can also be described using the position and orientation of either the camera or the inertial measurement unit.

The first pose of the mobile device (associated with the first image frame) is localised without using the inertial data—that is, localising the first pose is independent of the inertial data. The first pose may be localised based solely on the comparison of the extracted visual features of the first image frame with the landmarks associated with the keyframes.

After the first pose has been localised independently of the inertial data, the method may comprise calibrating the inertial data to the map. Calibrating the inertial data may comprise setting initial conditions for integration of the inertial data. The calibrating may be based on the first pose and estimated initial values for speed and sensor-bias. The initial values for speed and sensor-bias may be estimated by combining visual and inertial measurements over several frames.

The first frame and second frame need not be consecutive frames. In general, the second frame can be any frame after the first frame. A pose may be calculated for every frame after the first frame in the same way as defined for the "second" frame.

The extracted visual features may be multiscale features in a nonlinear scale space, optionally Accelerated KAZE features. In the AKAZE approach, feature points can be detected by identifying maxima of a determinant of a Hessian matrix in the nonlinear scale space.

The extracted visual features and the landmarks may be described using rotation- and scale-invariant descriptors, optionally binary descriptors, optionally M-LDB descriptors. These descriptors may be generated by estimating a dominant orientation of the visual feature, rotating the visual feature based on the dominant orientation, and extracting a binary descriptor from the rotated visual feature.

The extracted visual features may be compared and matched with the landmarks by comparing their binary descriptors.

The descriptors may be generated using a gravity direction derived from the inertial data. In particular, the dominant orientation of the visual feature can be estimated as being the gravity direction. This provides descriptors that are invariant to rotations of the camera, while providing a rich description of the visual feature. The mobile device may include an accelerometer, for use in determining the gravity direction.

Comparing the extracted visual features of the first image frame with the landmarks associated with the keyframes optionally comprises converting the extracted visual features and the landmarks into a bag of words representation. This is an orderless representation, describing the frequency of occurrence of each of a plurality of "words", the "words" being visual feature descriptors from a dictionary of visual feature descriptors.

Each keyframe has a pose associated with it. Predicting the subset of the landmarks that are likely to be visible may comprise calculating a similarity metric between the predicted pose and the pose of each keyframe. The similarity metric may be based on at least one or any combination of two or more of: a translation cue that measures a translational difference in position between the respective poses; an orientation cue that measures a difference in orientation between the respective poses; and an appearance cue that measures visual similarity between the image frames associated with the respective poses.

The visual similarity may be determined using multiscale features in a nonlinear scale space, optionally Accelerated KAZE features. The visual similarity may be determined by comparing the features using rotation- and scale-invariant binary descriptors, optionally M-LDB descriptors. The visual similarity may be based on a bag of words representation.

The similarity metric may comprise a kernel function that combines the translation cue, orientation cue, and appearance cue. The kernel function may be learned on training data, for example using a memory-based learning method.

The likelihood of a given landmark being visible in the image frame may be predicted by a method comprising: for each keyframe in which the given landmark (from the existing map) is visible, calculating the similarity metric between the predicted pose and the pose of the keyframe; and combining the calculated similarity metrics over two or more keyframes in which the given landmark is visible.

The two or more keyframes may be selected as those being most similar to the predicted pose, according to the similarity metric. Combining the calculated similarity metrics may comprise summing them.

In some embodiments, matching the extracted visual features of the second image frame with the predicted subset of landmarks comprises comparing every one of the extracted visual features with every one of the predicted subset of landmarks. This is also referred to herein as "brute force" matching. In other embodiments, the matching may comprise guided matching, wherein positions of the predicted subset of landmarks in the second image frame are predicted based on the predicted pose, and the matching comprises selecting or prioritising the extracted visual features of the second image frame to compare with the landmarks, based on the predicted positions of the landmarks.

Calculating the second pose optionally comprises deriving at least one pose estimate by applying a perspective-3-point method to the matched visual features and respective landmarks. Perspective-n-point methods can allow the pose of a camera to be estimated from a set of n 3-D points (in this case, the landmarks) and their corresponding 2-D projections in the image frame (in this case, the matched visual features). In a P3P algorithm, the number, n, of points is 3.

Calculating the second pose optionally comprises applying a random sample consensus algorithm. In a RANSAC algorithm, the pose can be estimated over multiple iterations, each iteration using a randomly selected group (for example, triplet) of the matched 2-D visual features (and their corresponding 3-D landmarks) to derive a pose estimate. In each iteration, the quality of the pose estimate is checked by assessing how well that pose estimate fits the set of landmarks and matched visual features. The second pose may be generated based on the pose estimate giving the best fit. How well the pose estimate fits the landmarks and matched visual features can be assessed, for example, based on the number of landmarks and matched visual features that deviate from the pose estimate by less than a predetermined threshold error. These landmarks/matched visual features may be denoted "inlier" correspondences. The second pose may be generated by minimising the re-projection error of the inlier correspondences.

The method may further comprise initialising new keyframes in a local map, in the current session, from selected image frames of the series of image frames. This allows fresh data to be added into the pose estimation process. Initialising a keyframe may comprise: storing the relevant image frame as a keyframe; storing the extracted visual features of the image frame; and creating new landmarks associated with the keyframe. Each new landmark comprises a detected visual feature that is present in two or more keyframes of the local map and each new landmark defines a 3-D position for the respective visual feature.

Image frames may be selected as keyframes based one or more of a number of criteria. Selecting one or more images to be keyframes may be based at least in part on the inertial data. Inertial information can either be used alone or in combination with visual information, to guide the selection of keyframes.

Optionally, the selecting includes: detecting a saturation event in the inertial data; and in response, rejecting image frames captured during a first time interval after the saturation event. A saturation event occurs when one or more inertial sensors reports an inertial measurement equal to a maximum measurable value. Rejecting image frames means preventing the relevant frames from being selected as keyframes.

The selecting may include selecting an image frame to be a keyframe if the number of keyframes in a sliding temporal window before the image frame is below a first threshold.

The selecting optionally includes selecting an image frame to be a keyframe if a second time interval has elapsed since the preceding keyframe in the series of image frames. The selecting may include selecting an image frame to be a keyframe if, for that image frame, a value of a measure of uncertainty of the inertial data is greater than a second threshold. The selecting may include rejecting the image frame if the number of visual features extracted from that image frame is below a fourth threshold. The selecting may include comparing a convex hull of matched visual features in the current image frame with a convex hull of the matching landmarks from a previous keyframe, projected into the current image frame. The selecting may include rejecting an image frame if the number of inlier correspondences from pose estimation is below a sixth threshold.

Calculating the second pose for the second image frame may be based on both the landmarks from the existing map and the new landmarks from the local map.

The method may comprise matching the extracted visual features of the second image frame with the new landmarks from the local map, optionally comprising guided matching between the new landmarks and visual features, using the second pose. Accordingly, the step of calculating the second pose may be based on matched visual features and respective landmarks from the existing map, and additionally based on matched visual features and respective new landmarks from the local map. Guided matching can allow computational effort to be reduced or targeted more efficiently, when searching for additional matches.

The guided matching step may comprise searching for a match for a visual feature of the second image frame in one or more confidence regions in one or more of the keyframes, wherein the or each confidence region is predicted based on the second pose and the pose associated with the keyframe. The relationship between the two poses can allow the method to predict where in the keyframe to search for a given visual feature, or where in the image frame to search for a given landmark (or new landmark).

The method may further comprise removing landmarks that are observed in fewer than a predefined number of keyframes—in particular, removing from the local map new landmarks that are observed in fewer than the predefined number of keyframes. This helps to manage computational effort, by retaining only those landmarks that are more likely to be observed again in image frames.

Optionally, landmarks from the existing map are preserved and only new landmarks, associated with keyframes initialised in the local map in the current session, are removed.

The method may further comprise refining the second pose of the second image frame based on measurements associated with a sliding window comprising a first number of the most recent keyframes and a second number of the most recent frames.

The measurements may be used to calculate a re-projection error, associated with the matched visual features, and an inertial measurement error, associated with the inertial data. Refining the second pose may comprise minimising the sum of these errors. Refining the second pose may comprise solving a nonlinear least squares problem.

The use of a sliding window can enable computational complexity to be managed, by controlling the number of measurements that are used in to calculate the final pose estimate.

The method may further comprise removing measurements from the sliding window by performing a marginalisation of variables for those measurements. Marginalisation of variables offers a principled way to manage the number of measurements/variables in the pose estimation, while minimising the amount of information that is lost when measurements are removed from the sliding window.

The refining may comprise bundle adjustment, in which the 3-D positions of the landmarks from the existing map are held constant. Bundle adjustment involves simultaneously refining the 3-D positions of the landmarks, as well as the poses of the frames and keyframes in the sliding window. In the present approach, landmarks associated with new keyframes (i.e. the keyframes in the sliding window) may be updated in the bundle adjustment; however, landmarks from the pre-existing map are not updated—these parameters are held constant.

The method may further comprise: obtaining a position estimate based on satellite positioning signals; and (i) using the position estimate to assist in localising the first pose; and/or (ii) using the position estimate to assist in predicting the subset of landmarks likely to be visible.

For example, in some embodiments, the number of landmarks to be compared with the extracted visual features may be limited based on the position estimate. In some embodiments, the position estimate may be used to generate the translation cue, for determining the similarity metric between poses.

Also provided is a computer program comprising computer program code configured to cause one or more physical computing devices to perform all the steps of a method as summarised above, when said computer program is run on the one or more physical computing devices. The computer program may be stored on a computer readable storage medium, optionally a non-transitory storage medium.

Also provided is a mobile device configured to localise its pose using a method as summarised above.

According to another aspect there is provided a mobile device configured to localise itself in an existing map of a 3-D environment, based on visual and inertial data generated at the mobile device, the mobile device comprising:
  a memory, for storing the existing map, the existing map comprising a set of keyframes characterising the 3-D environment, each keyframe having associated with it a plurality of landmarks, each landmark being a detected visual feature that is present in two or more keyframes and each landmark defining a 3-D position for the respective visual feature;
  a camera, configured to capture the visual data comprising a series of image frames;
  an inertial measurement unit, configured to generate the inertial data, wherein the inertial measurement unit comprises at least one or any combination of two or more of: an accelerometer, a gyroscope and a compass;
  one or more processors, configured to:
    extract visual features from each image frame in the series of image frames;
    for a first image frame in the series of image frames, localise a respective first pose of the mobile device, comprising comparing the extracted visual features of the first image frame with the landmarks associated with the keyframes;
    for a second, later image frame in the series of image frames:
      calculate a predicted pose based on the first pose and the inertial data,
      based on the predicted pose, predict a subset of the landmarks that are likely to be visible in the second image frame, match the extracted visual features of the second image frame with the predicted subset of landmarks, to identify matched visual features; and
calculate the second pose of the mobile device associated with the second image frame based on the matched visual features and the respective landmarks.

The mobile device may be comprised in a handheld device, robot, or a vehicle. The vehicle may be an unmanned and/or autonomous vehicle. The vehicle may be a land vehicle, an aerial vehicle, a marine vehicle or a submarine vehicle, for example.

BRIEF DESCRIPTION OF THE DRAWINGS

The invention will now be described by way of example with reference to the accompanying drawings, in which.

Figure 1:
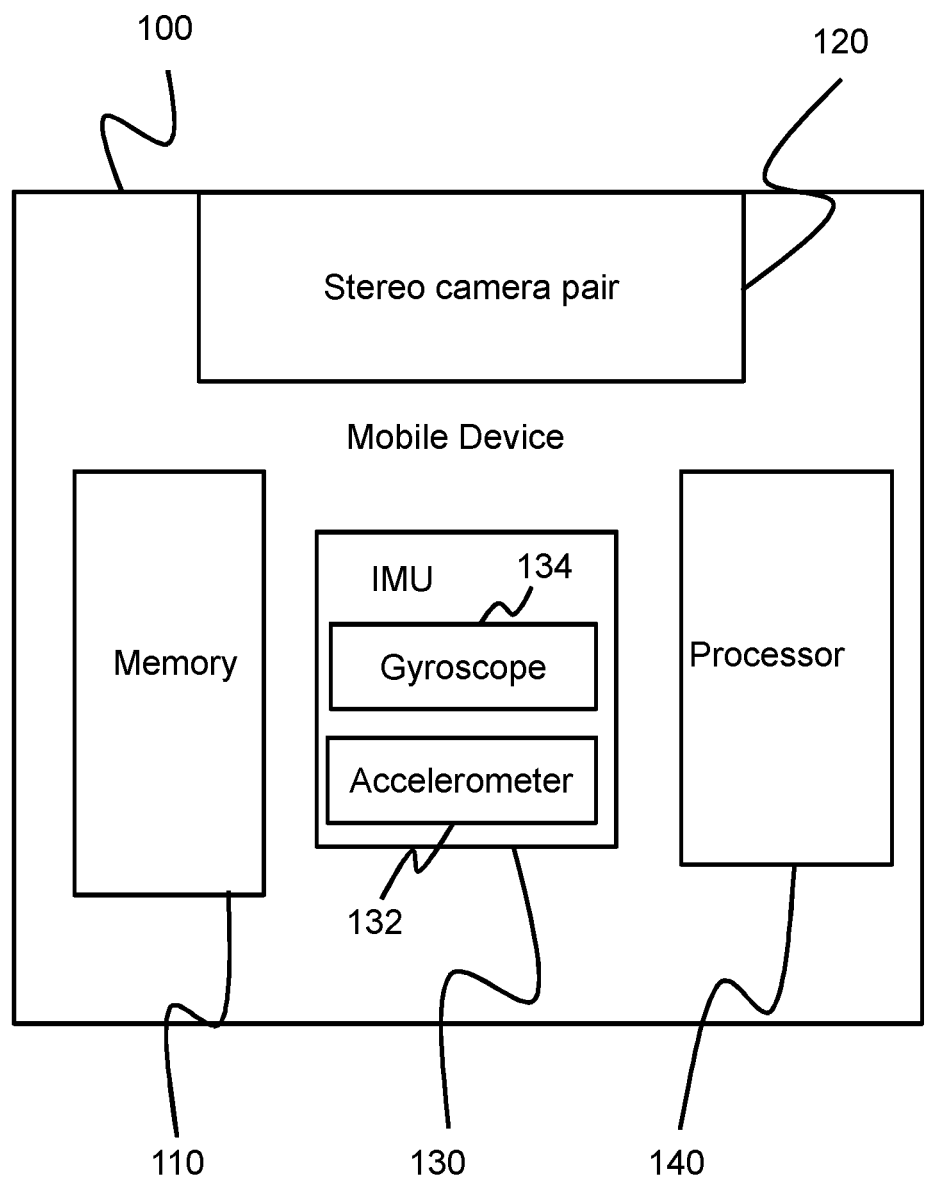
FIG. 1 is a block diagram of a mobile device according to an example.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

FIG. 1 shows a block diagram of a mobile device 100 according to an example. As will be described below, the mobile device 100 is configured to operate in two modes. In a first mode, it performs simultaneous localisation and mapping (SLAM) using visual and inertial data. In this mode, it produces a map of the environment in which it is navigating. In a second mode, the mobile device performs a localisation method—not mapping the environment, but localising itself within an existing map, generated previously while it was in the first mode. Of course, it will be understood that the map need not be generated by the same device that uses the map for localisation in the second mode.

It is possible that one mobile device may generate the map (operating in the first mode) and another device may consume the map, to localise itself within the mapped environment (operating in the second mode). The mobile device may be part of a handheld device, a robot, or a vehicle (such as a drone), for example.

As shown in FIG. 1, the mobile device comprises: a memory 110; two cameras, operating as a stereo pair 120; an inertial measurement unit (IMU) 130; and a microprocessor 140. The IMU includes an accelerometer 132 and a gyroscope 134. In some examples, it may further comprise a compass.

Figure 2:
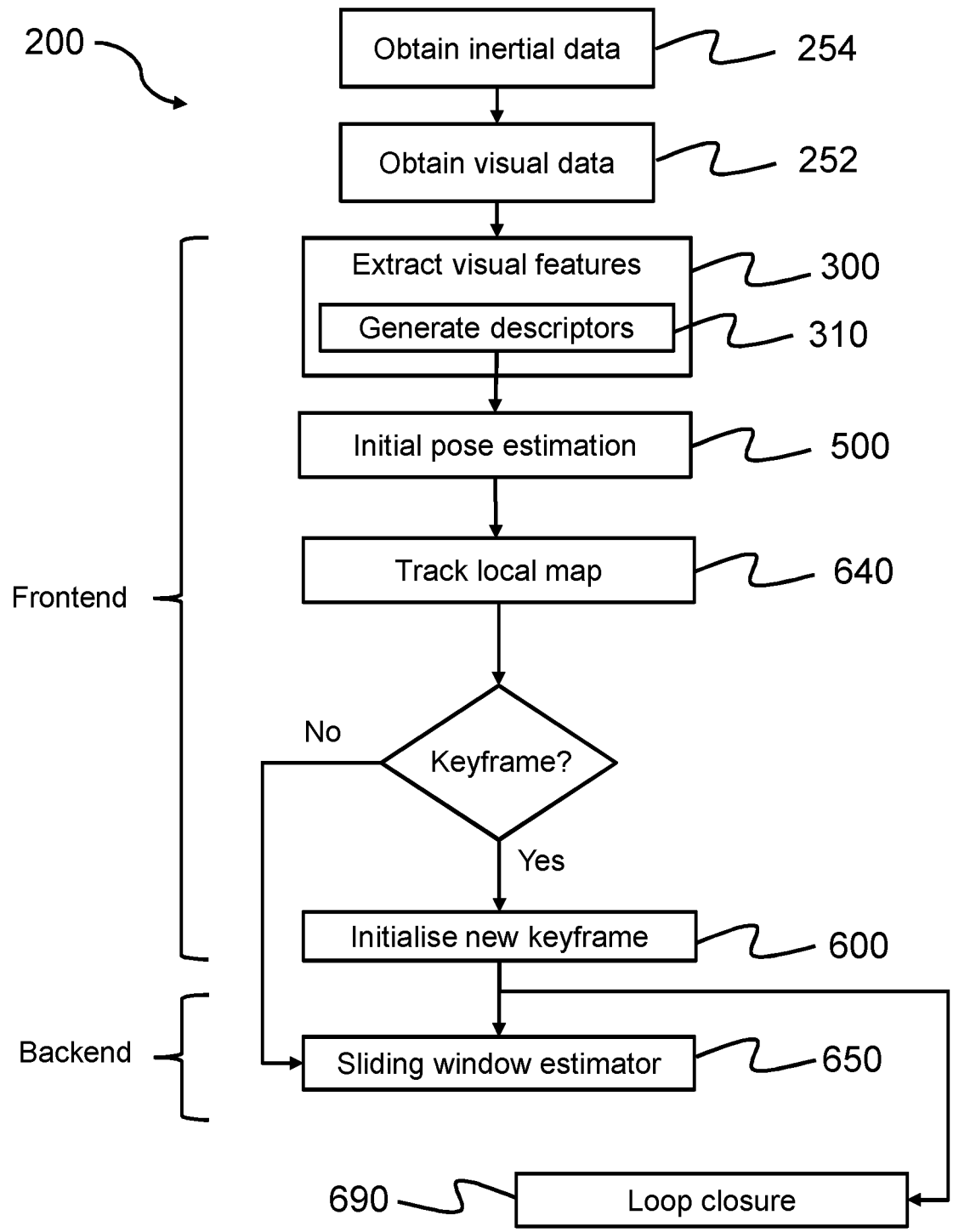
FIG. 2 is a flowchart illustrating a method for visual-inertial SLAM.

FIG. 2 illustrates a method performed by the processor of the mobile device, when the device is operating in the first mode (visual-inertial SLAM). In step 254, the processor obtains inertial data generated by the IMU 130. In step 252, the processor obtains visual data (image frames) generated by the stereo camera pair 120.

In step 300, the processor extracts visual features from the image frames captured by the cameras. This includes generating 310 binary descriptors of the visual features. In step 500, the processor performs an initial pose estimation. In step 640, local map tracking is performed. If the current frame is selected for creation of a keyframe, then the processor initialises the new keyframe in step 600.

In step 650, the processor carries out a sliding window estimation, to refine the initial pose estimate. Meanwhile, in step 690, loop closure processing is performed.

The individual steps will be described in greater detail below, with reference to FIGS. 3-6. Firstly, we need to introduce some notation.

Coordinate Frames and Navigation State

The system tracks a moving body with a mounted IMU and a stereo camera rig relative to a static world coordinate frame denoted as $\mathcal{F}_W$. The IMU sensor coordinate frame is denoted as $\mathcal{F}_S$ and the stereo camera frames are represented as $\mathcal{F}_{C_i}$ with i=1,2. The following SLAM navigation state representation is used:

$$x_{nav} = [x_{WS}, v_W^T, b_g^T, b_a^T] \in \mathbb{R}^3 \times S^3 \times \mathbb{R}^9, \quad (1)$$

where $x_{WS}$ represents the location and attitude of the sensor (i.e. pose) between the position of the origin of $\mathcal{F}_S$ relative to $\mathcal{F}_W$ coordinate frames. The vector $v_W$ represents the linear velocity of the sensor in the $\mathcal{F}_W$ coordinate frame. Vectors $b_g$ and $b_a$ represent the gyro and accelerometer biases respectively. The navigation state $X_{nav}$ is estimated at every time step n for which frames from the stereo camera rig are available.

Each pose is represented by the tuple $x_{WS} = (t_W, q_{WS})$, consisting of a translation vector and a unit quaternion that represents its orientation. Whenever needed, a sensor pose can be converted into its corresponding Euclidean transformation matrix as follows:

$$T_{WS} = \begin{pmatrix} R(q_{WS}) & t_W \\ 0^T & 1 \end{pmatrix} \in \mathbb{R}^{4 \times 4}, \quad (2)$$

where, for a unit quaternion $q_{ws}$, the expression $R(q_{WS}) \in SO(3)$ is the corresponding rotation matrix.

Visual Inertial SLAM Mode

In this section, we describe the main components of our Visual Inertial SLAM system (when operating in the first mode). This is used to create the global 3D maps, optimised camera motion, and landmark visibility information that will be used subsequently by the localisation system (when operating in the second mode). Stereo image data and IMU readings are processed by a "frontend" algorithm, which performs feature extraction and creates 3D-2D correspondences and keyframes, which are then fed into the estimator alongside pre-integrated IMU measurements. The loop closure module processes keyframes and performs pose graph optimisation once a candidate loop closure is found.

Frontend

The system uses Accelerated KAZE (A-KAZE) to extract 300 and track features for each frame, due its high detector repeatability. The detected feature points are described by generating 310 Modified Local Difference Binary (M-LDB) descriptors. These are found to provide good performance compared with other binary feature descriptors. (For details of the A-KAZE and M-LDB algorithms, see P. F. Alcantarilla, J. Nuevo, and A. Bartoli, "Fast explicit diffusion for accelerated features in nonlinear scale spaces," in British Machine Vision Conf. (BMVC), 2013.) Rotation-invariant descriptors are extracted by projecting the gravity direction (provided by the accelerometer in the IMU) into the image.

Initial Pose Estimation

The system is initialised when a stereo frame contains a certain number of feature correspondences that are triangulated into 3D landmarks. This first frame is added into the system as a keyframe and this frame defines the world coordinate frame $\mathcal{F}_W$. After the first frame, for incoming stereo frames and IMU data, the system aims to first find a good initial pose with respect to the world frame.

Figure 3:
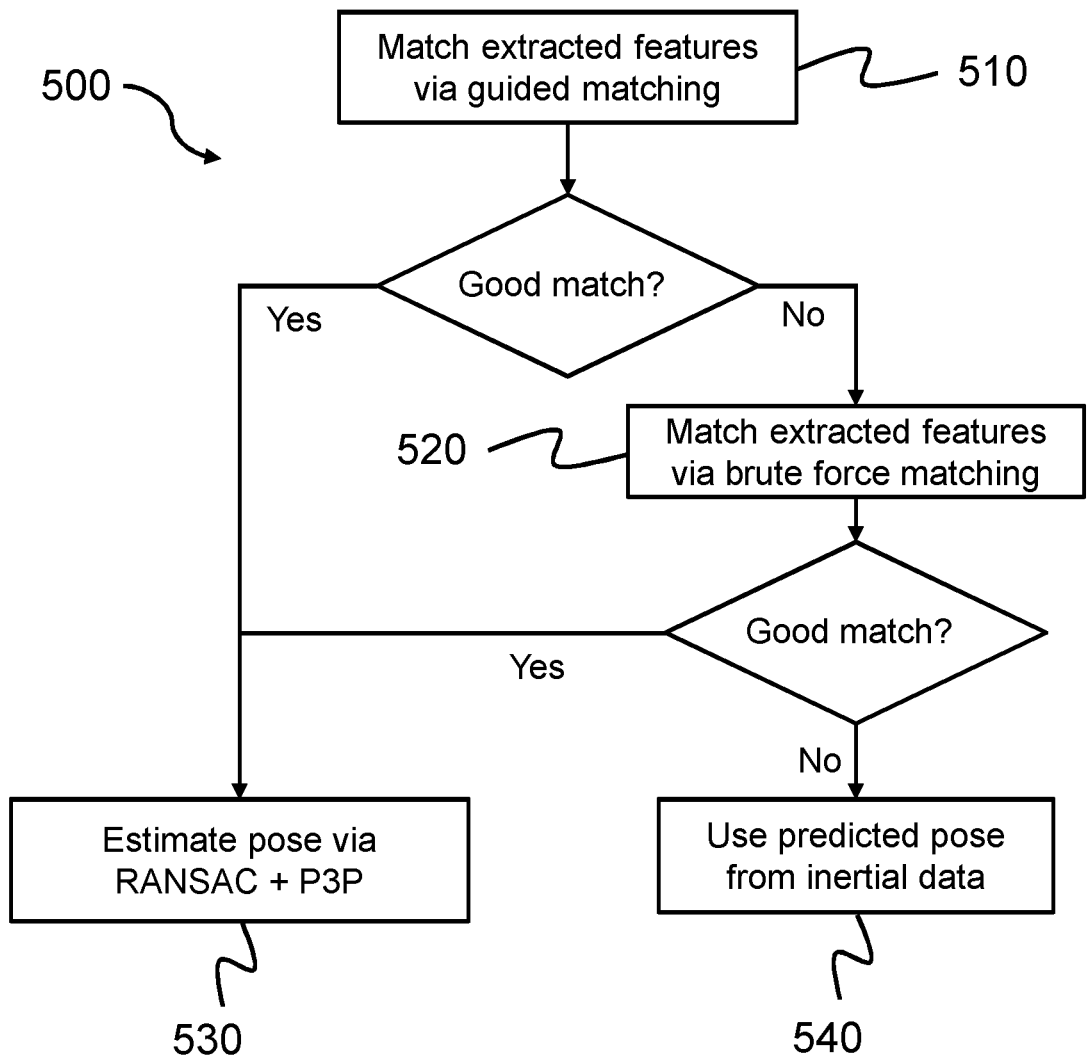
FIG. 3 is a flowchart illustrating the initial pose estimation step in the method of FIG. 2.
Figure 4:
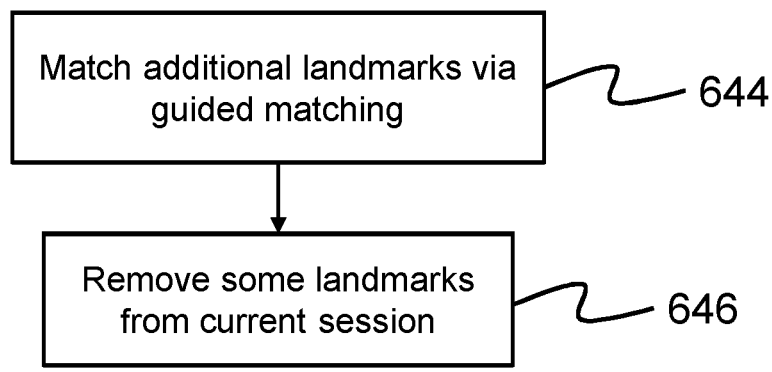
FIG. 4 is a flowchart illustrating the local map tracking step in the method of FIG. 2.
Figure 5:
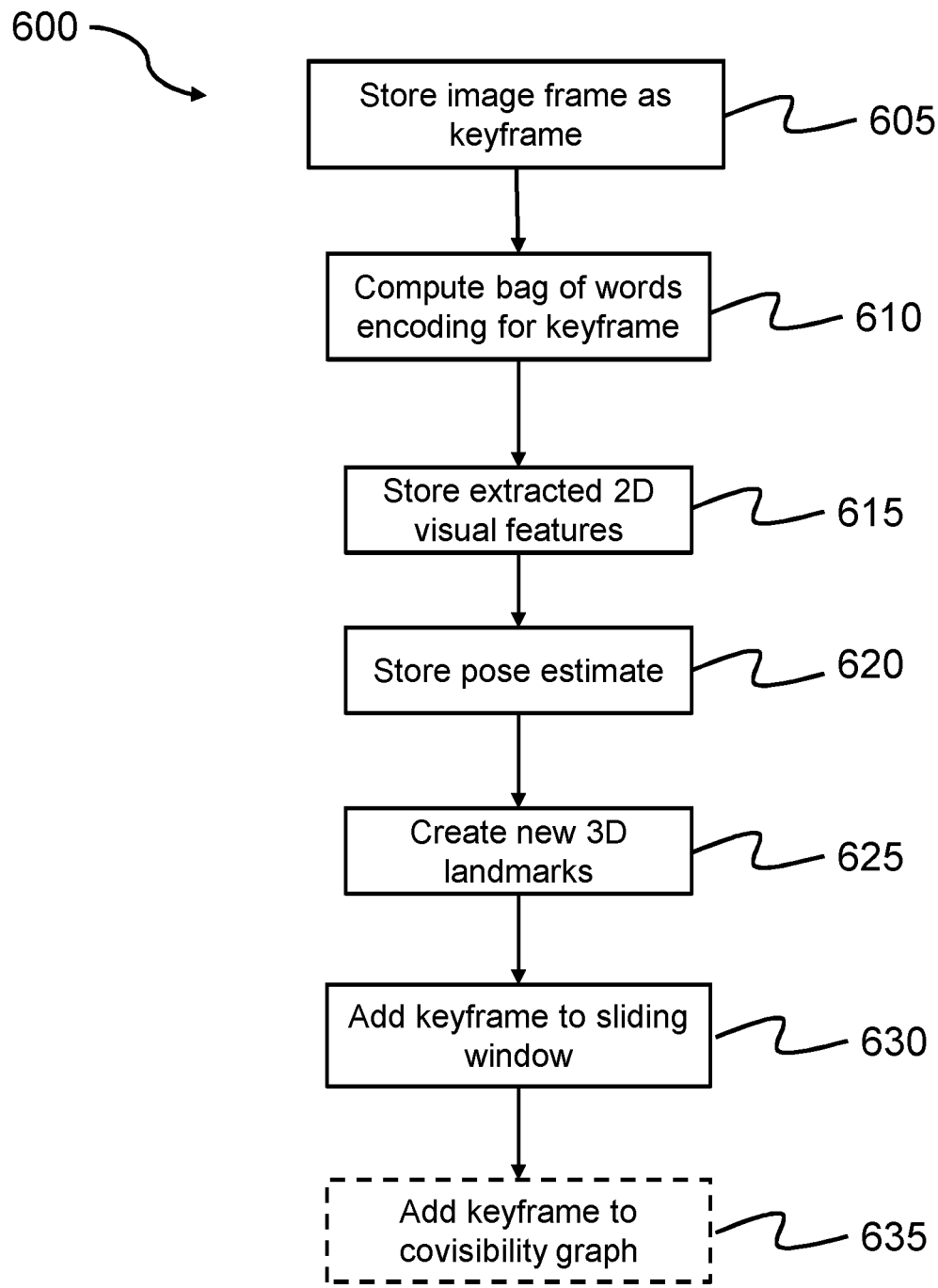
FIG. 5 is a flowchart illustrating a process for initialising a new keyframe.

FIG. 3 depicts the different steps in the initial pose estimation process 500. First, 3D-2D putative correspondences between the last two consecutive frames are established by means of guided matching 510, using confidence regions predicted by IMU measurements. A similarity-based Hamming distance threshold is used for matching binary descriptors. If guided matching does not return a successful set of putative correspondences, brute force matching 520 with nearest neighbor distance ratio (NNDR) is used instead. (See D. Lowe, "Distinctive image features from scale-invariant keypoints," Intl. J. of Computer Vision, vol. 60, pp. 91-110, 2004.)

The set of putative correspondences is fed into a RANSAC framework 530 to estimate an absolute pose by means of a P3P method for non-central cameras. (See M. Fischler and R. Bolles, "Random sample consensus: a paradigm for model fitting with application to image analysis and automated cartography," Commun. Assoc. Comp. Mach., vol. 24, pp. 381-395, 1981.) The initial pose is refined by minimising the reprojection error of the inlier correspondences. The set of inliers are added as observations into the backend. For those cases in which the system is unable to find a good initial pose, the predicted pose from pre-integrated IMU measurements is used instead. (See: C. Forster, L. Carlone, F. Dellaert, and D. Scaramuzza, "On-manifold preintegration for real-time visual-inertial odometry," IEEE Trans. Robotics, vol. 33, no. 1, pp. 1-21, 2017.)

Local Map Tracking

In the local map tracking step 640, the refined initial pose is used to match (track) additional 3D landmarks from the local map by means of guided matching 644. The final set of putative correspondences contains putatives from the last frame to the current frame and from the local map to the current frame to improve accuracy. RANSAC+P3P is used again to discard some potential outliers, and the final pose is refined by minimising the reprojection error of the inlier correspondences. We also perform map maintenance in order to keep only trackable 3D visual landmarks in the system. Those 3D landmarks that are observed only by a small number of keyframes ≤3) are removed 646 from the system.

Keyframe Creation and Initialisation

For keyframe creation 600, our approach combines different cues, such as a minimum number of detections and inliers, and the ratio between the convex hulls of the matched landmarks from the current frame and projected 3D landmarks from the last keyframe. The process of keyframe selection will be described in greater detail later, below.

When a keyframe is created, the relevant image frame is stored 605 as a keyframe; and the corresponding extracted 2D visual features are stored 615. New 3D landmarks are triangulated and added 625 into the system. For creating new landmarks, we find and triangulate stereo correspondences between the two images of the stereo pair and across stereo image pairs from the last keyframe and the current frame. Those 3D landmarks with large depth uncertainty after triangulation are not added into the system.

In SLAM mode, each new keyframe is added 635 to the covisibility graph. The covisibility graph is an undirected weighted graph that encodes covisibility information between keyframes. Each node in the graph represents a keyframe, whereas an edge between nodes exists only if two keyframes share a minimum number of common landmark observations.

For each new keyframe, we compute 610 its Bag of Words (BoVV) encoding by using DBoW3 and a pre-built visual vocabulary. (See D. Galvez-Lopez and J. D. Tardos, "Bags of binary words for fast place recognition in image sequences," IEEE Trans. Robotics, vol. 28, no. 5, pp. 1188-1197, 2012.)

The new keyframe is added 630 to the sliding window estimator (further details below).

Sliding Window Visual-Inertial Estimator

Our visual inertial estimator 650 combines reprojection and IMU errors. We formulate the multi-sensor fusion SLAM problem as a factor graph, in which each factor encodes the connectivity between the unknown variable nodes and the sensor measurements. (Factor graphs are described in: F. R. Kschischang, B. J. Frey, and H.-A. Loeliger, "Factor graphs and the sum-product algorithm," IEEE Trans. Inform. Theory, vol. 47, no. 2, pp. 498-519, 2001.)

The objective is to estimate a set of navigation states $\mathcal{X}^* = \{x_{nav}^n\}_{n=1:N_{states}}$ for each time step n, and additionally estimate a collection of visual landmarks $\mathcal{Y}^* = \{Y_W^j\}_{j=1:N_{landmarks}}$, given a set of sensor measurements $\mathcal{Z}$ that includes visual and IMU measurements. Here, each landmark $Y_W^j \in \mathbb{R}^3$ is expressed in the world coordinate frame. $N_s$ and $N_l$ represent the total number of states and landmarks.

The joint probability distribution of the navigation states and landmarks $\Theta = \{\mathcal{X}^*, \mathcal{Y}^*\}$ given the measurements $\mathcal{Z}$, can be factorised as the product of the contribution of each individual factor in the graph:

$$P(\mathcal{X}, \mathcal{Y}, \mathcal{Z}) \propto \prod_{i=1} f_i(\Theta^i), \qquad (3)$$

where $\Theta^i$ represents a subset of the variable nodes. Each factor $f_i$ represents an error function that connects a set of variables and measurements. Our goal is to estimate the navigation states $\mathcal{X}^*$ and visual landmarks $\mathcal{Y}^*$ that maximise the factorisation in Eq. 3.

We assume a Gaussian measurement model for the factors in the graph of the form:

$$f_i(\Theta^i) \propto \exp\left(-\frac{1}{2}\|z^i - h_i(\Theta^i)\|_{\Sigma^i}^2\right). \quad (4)$$

The factor graph in Eq. 3 can be estimated via maximum a posteriori (MAP) estimation, which is equivalent to solving the following non-linear least squares problem that comprises a sum of different error terms:

$$\operatorname{argmin}_\Theta(-\log f(\Theta)) = \operatorname{argmin}_\Theta \frac{1}{2}\sum_i \|z^i - h_i(\Theta^i)\|_{\Sigma^i}^2, \quad (5)$$

where $h(\Theta^i)$ is a measurement prediction function, $z^i$ is a sensor measurement, and $\|\cdot\|_{\Sigma^i}^2$ is the Mahalanobis distance induced by the measurement covariance $\Sigma^i$. Let us discuss in more detail the error terms for each sensor:

Reprojection Error: This error measures the reprojection error of the j-th landmark $Y_W^j$ into the i-th camera from the stereo rig at time step k, with respect to the corresponding image measurement $z^{i,j,k} \in \mathbb{R}^2$:

$$e_{rep}^{i,j,k} = \|z^{i,j,k} - \pi(T_{SC_i}^{-1} T_{WS^k}^{-1} Y_W^j)\|_{\Sigma_{proj}^{i,j,k}}^2 \quad (6)$$

where $\pi(\cdot)$ is the camera projection function. In order to deal with outliers and spurious measurements, we use the Cauchy loss function as a robust kernel.

IMU Error: The IMU error measures the error between navigation parameters (pose, speed and biases) from two different time steps k and r, with r≥k, given IMU measurements $z_s^{k,r}$ (gyro and accelerometer readings) between both navigation states. This factor uses pre-integrated IMU measurements.

$$e_{IMU}^{k,r} = \|x_{nav}^r \ominus \hat{x}_{nav}^r(x_{nav}^k, z_s^{k,r})\|_{\Sigma_{IMU}^{k,r}}^2, \quad (7)$$

where $\hat{x}_{nav}^r(x_{nav}^k, z_s^{k,r})$ denotes the predicted navigation state at time step r based on a previous state estimate $x_{nav}^k$ and IMU readings $z_s^{k,r}$. The operator $\ominus$ calculates the difference in the tangent space by applying the log map. (Further details of how to pre-integrate IMU measurements can be found in: T. Lupton and S. Sukkarieh, "Visual-inertial-aided navigation for high dynamic motion in built environments without initial conditions," IEEE Trans. Robotics, vol. 28, no. 1, pp. 61-76, 2012; and C. Forster, L. Carlone, F. Dellaert, and D. Scaramuzza, "On-manifold preintegration for real-time visual-inertial odometry," IEEE Trans. Robotics, vol. 33, no. 1, pp. 1-21, 2017.)

Figure 6:
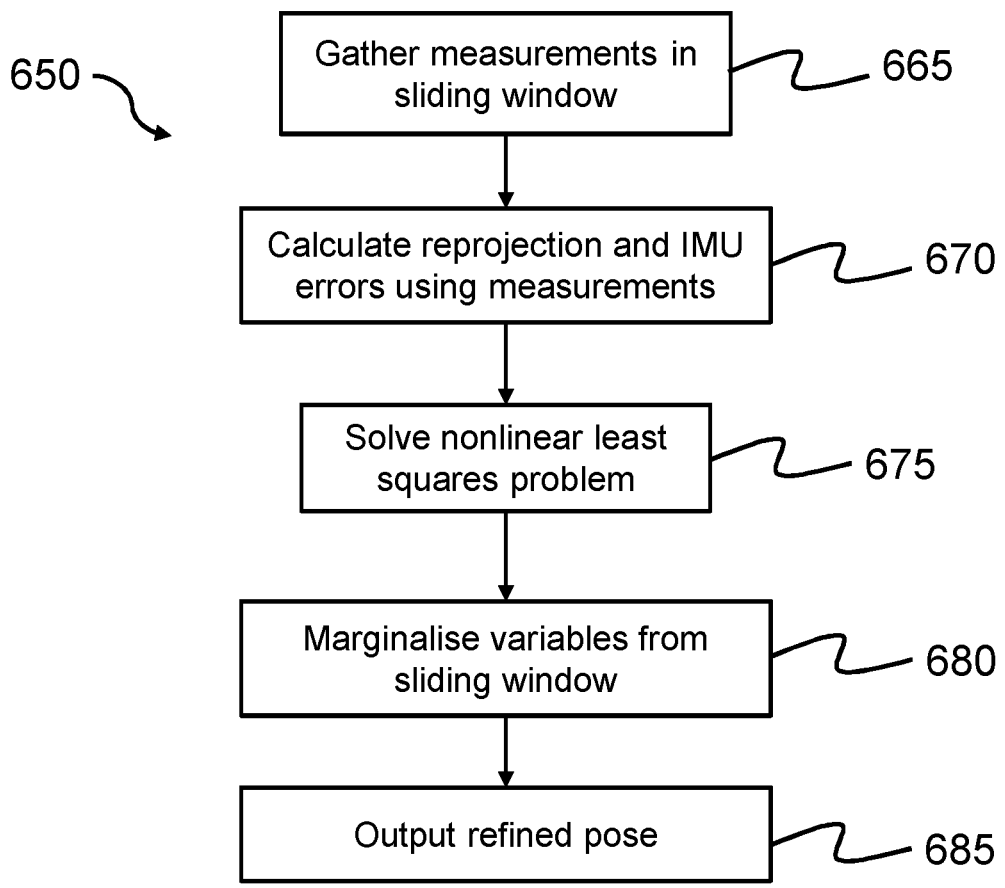
FIG. 6 is a flowchart illustrating a sliding window estimator.

The calculation of the errors is represented in FIG. 6 by step 670. Eq. 5 represents a bundle-adjustment problem. We solve 675 this non-linear least squares problem by means of Levenberg-Marquardt and a Schur-complement linear solver with Jacobi preconditioning. (See B. Triggs, P. F. McLauchlan, R. I. Hartley, and A. W. Fitzgibbon, "Bundle Adjustment A Modern Synthesis," in In International Workshop on Vision Algorithms: Theory and Practice (IVVVA), 1999.) We use a sliding window with N keyframes and M frames (in the present example, we use M=5 and N=3) and also perform marginalisation of variables. When states need to be marginalized 680 from the sliding window, all the error terms related to the variables to be marginalised are transformed into one linear error term that is added to the optimisation problem. In addition to reprojection and IMU errors, we use a prior pose error for the first pose of the sliding window in order to fix the coordinate frame of the reconstruction.

The sliding window estimator outputs 685 a refined pose estimate, calculated by solving the bundle adjustment problem.

Loop Closure Detection and Correction

Our loop closure detection routine 690 runs on a separate thread from the visual inertial SLAM system. When a new keyframe has been added into the system, the loop closure detection module aims to find loop closure candidates from among the previous keyframes in the covisibility graph. Loop closure allows the mobile device to determine when it has returned to a part of the environment that has already been mapped.

We use covisibility information to incorporate spatial and temporal checks for extra robustness when accepting query keyframes as potential loop closure candidates. Valid loop closure candidates go through a final geometric verification check, which comprises: finding putative 3D-2D correspondences between the query keyframe and the candidate keyframe; and estimating an absolute pose by means of RANSAC. Those candidates that show a large number of inliers and a high inlier-ratio, in the RANSAC algorithm, are considered in the loop closure correction module.

The loop closure correction module performs pose graph optimisation for the keyframes in the covisibility graph by using, as measurements, relative pose transformations between nodes in the factor graph, along with the relative transformations from the loop closure candidates and corresponding covariance matrices. The pose graph optimisation aims to estimate a factor graph via MAP estimation, considering that the variables are poses and the measurements are relative pose transformations. The error term between two poses is as follows:

$$e_{between}^{k,r} = \|z_S^{r,k} \ominus \hat{x}_S^{r,k}\|_{\Sigma_{rel.}^{k,r}}^2, \quad (8)$$

where $z_s^{r,k}$ is the relative pose measurement between poses $x_{WS^k}$ and $x_{WS^r}$.

If the pose graph optimisation problem converges, the keyframes in the covisibility graph are updated with the new corrections alongside the corrected 3D landmarks anchored to their corresponding keyframes. Additionally, any duplicated map points after the loop closure correction are merged into single points.

Global Bundle Adjustment

The steps performed by the frontend—namely, steps 300, 310, 500, and 640—as well as the steps performed by the backend 650, and the loop closure processing 690 are run iteratively for each new image frame captured by the cameras. In this way, a map is accumulated, containing keyframes, their estimated poses, and their 3D landmarks.

At the end of the mapping session, we perform offline global bundle adjustment, minimising the reprojection errors of all the 3D landmarks visible in the keyframes from the covisibility graph. In our global bundle adjustment cost we also add the loop closure constraints. We also remove landmarks that have large reprojection errors or poor visibility—in particular, any landmarks being observed in fewer than 2 keyframes are removed.

Learning Visibility of Landmarks

Once the visual-inertial SLAM system finishes processing a sequence (that is, finishes a mapping session), we use the set of optimised keyframe poses and 3D landmarks $\Theta = \{ \mathcal{X}^*, \mathcal{Y}^* \}$ for learning how to predict the visibility of known 3D points with respect to a query camera pose in the large-scale environment. Note that all the data needed for this purpose is already present in the covisibility graph. The visibility of each 3D landmark with respect to a camera pose is modelled by means of a memory-based learning approach, in which a distance metric between poses is learned in an entirely non-parametric way. (For reference, some related work can be found in: P. F. Alcantarilla, K. Ni, L. M. Bergasa, and F. Dellaert, "Visibility learning for large-scale urban environment," in IEEE Intl. Conf. on Robotics and Automation (ICRA), 2011, pp. 6205-6212.)

In the visibility prediction problem, we are interested in the posterior distribution of a certain 3D landmark $Y_w^j$ being visible given a query camera pose x, denoted as $P(v^j=1|x)$. For this purpose, we apply the principles of a memory-based learning approach, known as Locally Weighted Learning. (See C. Atkeson, A. Moore, and S. Schaal, "Locally weighted learning," AI Review, vol. 11, pp. 11-73, 1997.) Given training data (keyframe poses, 3D landmarks and visibility information) and a query pose, we form a locally weighted average at the query pose and take that as an estimate of the visibility posterior as follows:

$$P(v^j = 1|x) \approx \frac{\sum_{i=1}^{N} k\left(x, x_i^{v^j=1}\right)}{\sum_{i=1}^{N} k(x, x_i)}, \tag{9}$$

where $x_i^{v^j=1}$ are the camera poses from the training data in which the 3D point $Y^j$ is visible. The function $k(x, x_i)$ is a weighting function or kernel function that is used to calculate a similarity score between camera poses.

The kernel function that we use combines the Mahalanobis distance and the Gaussian kernel, and it applies to any distance-based kernel function with differentiable dependencies on parameters specifying the distance function. The kernel function to measure the similarity between two camera poses is as follows:

$$k_{ij} = k(x_i, x_j) = \exp(-\|A(x_i - x_j)\|^2), \tag{10}$$

where the matrix A is the square root information matrix and hence it has also full rank.

A very high similarity score (approaching a value of 1) suggests that two camera poses will observe the same set of landmarks, while a low score (approaching 0) means that the two cameras are unlikely to share any landmarks in common. The vectors $x_i$ and $x_j$ encode information about the camera pose and its appearance information. In particular, we use three cues in our kernel function: differences in camera translation, viewing direction, and appearance by means of BoW encoding. In greater detail, the cues comprise:

Translation: Measures the differences between the translation of two cameras in $\mathcal{F}_W \|t_W^i - t_W^j\|^2$.

Orientation: Measures orientation differences by using the normalised inner-product between the viewing directions of the two cameras—that is, $$1 - \frac{\langle v_{d_i}, v_{d_j} \rangle}{|v_{d_i}||v_{d_j}|}$$

where $v_d$ is the camera viewing direction, extracted from the pose quaternion.

Appearance: Measures an $L_1$ similarity score between two BoW vectors—namely, $$1 - \frac{1}{2}\left\|\frac{v_{bow_i}}{|v_{bow_i}|} - \frac{v_{bow_j}}{|v_{bow_j}|}\right\|.$$

The BoW vectors $v_{bow_i}$ and $v_{bow_j}$ are computed from the raw binary descriptors and visual vocabulary.

Once the global bundle adjustment has converged, after a mapping session (as discussed above), the processor 140 learns an appropriate kernel function, by minimising a loss function between the predicted values from the kernel function and target values $y_{ij}$:

$$L_{visibility} = \sum_i \sum_{j \geq i} \|y_{ij} - k_{ij}\|^2. \tag{11}$$

The learning algorithm uses the map contents for training data. As target values $y_{ij}$, we use the mean of the ratios between the intersection of the common 3D landmarks relative to the number of 3D points visible to each of the two cameras:

$$y_{ij} = \frac{1}{2} \cdot \left[ \frac{|Y_i \cap Y_j|}{|Y_i|} + \frac{|Y_i \cap Y_j|}{|Y_j|} \right], \tag{12}$$

where $Y_i$ denotes the number of 3D landmarks being observed from camera pose $x_i$. We minimise this non-linear least squares function by using the Levenberg-Marquardt algorithm. In order to reduce the number of parameters in the estimation we model A as a symmetric matrix.

A key observation is that the results of the visibility prediction in Eq. 9 will be mostly zero for many of the 3D landmarks in a large map, since most of the landmarks would not be observed at all by the K-Nearest Neighbors (KNNs) of the query pose. As a consequence, rather than predicting the visibility individually for each landmark (which could be prohibitively expensive in large-scale maps), we find the KNNs of the current query pose, and then predict the visibility for the subset of landmarks seen at least once by these KNNs. Then, we can set the visibility to zero for the rest of the landmarks without computing them at all. Finally, the locally weighted K nearest neighbor approximation for the visibility posterior is:

$$P(v^j = 1|x) \approx \frac{\sum_{i=1}^{K} k\left(x, x_i^{v^j=1}\right)}{\sum_{i=1}^{K} k(x, x_i)}, \tag{13}$$

where only the nearest K samples of the query pose are considered in the average.

Visual Inertial Localisation System

The operation of the system in the second mode (visual inertial localisation) is based on the first mode (SLAM mode) described above. However, the key difference now is that the 3D landmarks in the existing map, generated in the previous session, are kept constant. More formally, we want to estimate the joint probability distribution of the navigation states and a new set of landmarks for the localisation run $\Theta_{loc}=\{ \mathcal{X}^*, \mathcal{Y}^* \}$ given the landmarks from the existing map $\mathcal{Y}_{map}$ and the measurements $\mathcal{Z}$:

$$P(\mathcal{X}, \mathcal{Y}; \mathcal{Y}_{map}, \mathcal{Z}) \propto \prod_{i=1} f_i(\Theta_{loc}^i). \qquad (14)$$

We use the same error terms as in the first mode (described above). However, the localisation system introduces several differences—for example, when bootstrapping the system and also in the frontend and backend.

Figure 7:
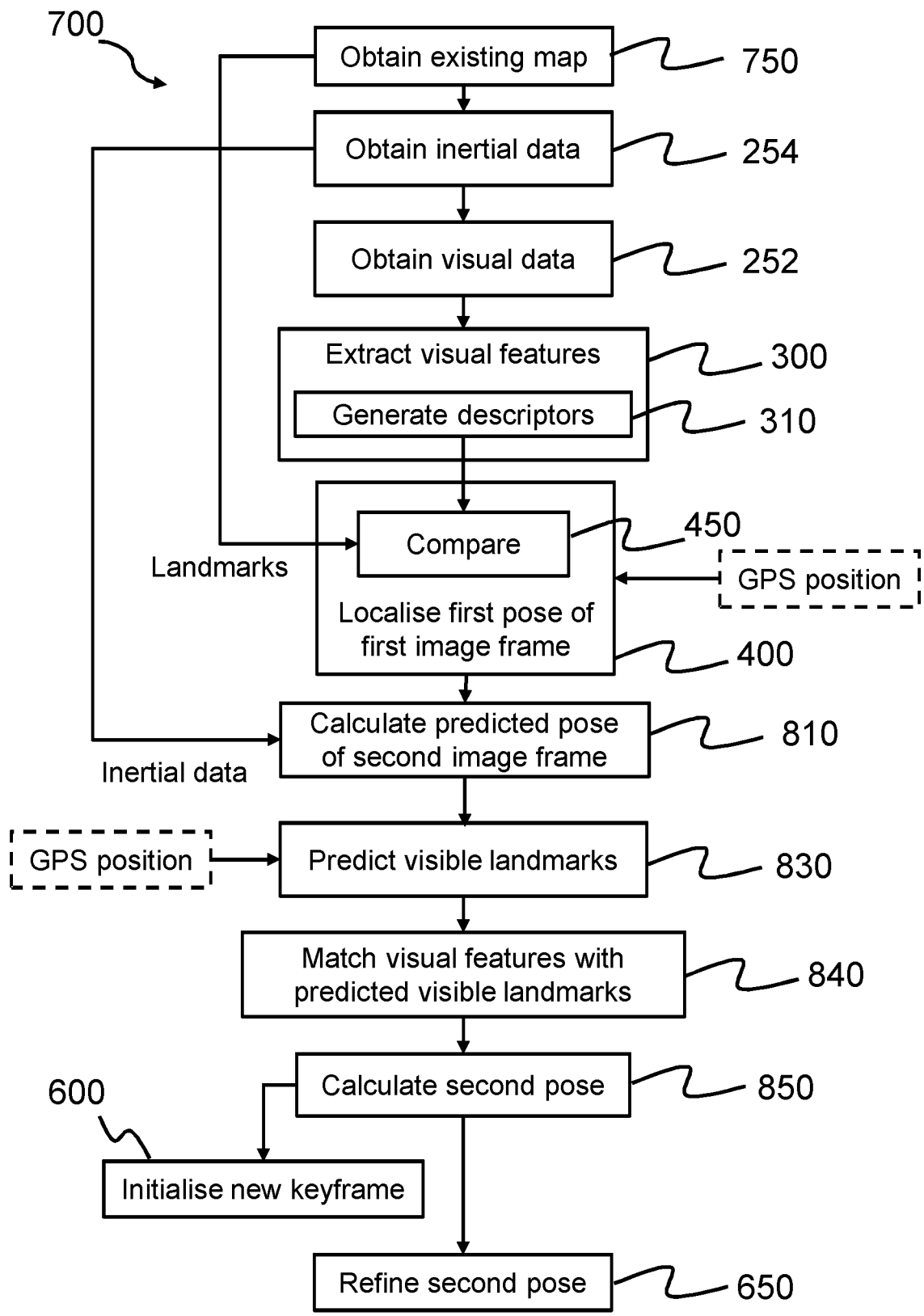
FIG. 7 is a flowchart illustrating a method for visual-inertial localisation in an existing map, according to an example.

FIG. 7 illustrates a localisation method performed in the second mode, according to an example. In step 750, the processor 140 obtains the existing map, from the previous SLAM session. The map may be stored in the memory 110. In step 254, the processor obtains inertial data from the IMU 130. In step 252, the processor obtains visual data (image frames) from the camera pair 120.

In step 300, the processor extracts visual features from the image frames, (again using A-KAZE, in this example), and generates (in step 310) binary descriptors (again based on M-LDB descriptors, in this example). As before, rotation invariant descriptors are extracted, using gravity estimation from the IMU measurements. The raw descriptors are converted into the Bag of Words (BoWs) representation.

Bootstrapping and Relocalisation

When the new session starts (in localisation-only mode), the system does not initialise until a successful relocalisation with respect to the previously built global map is found. The localisation system uses visual information to initialise the pose at the start of the session. The system needs a successful relocalisation with respect to the previously built global map to be initialised. The relocalisation involves localising 400 a first pose of a first image frame. To do this, descriptors generated in step 310 are compared (step 450) with the keyframes in the covisibility graph, using the BoWs representation. For those candidates with a high similarity score, a further geometric check based on P3P+RANSAC is performed to estimate the initial pose in $\mathcal{F}_W$, in order to initialise the localisation system. In this way, the first pose of the first image frame is localised purely using visual data. Note that the "first image frame" is not necessarily the very first frame in the sequence from the cameras 120. The frames from the camera are processed until a pose can be relocalised.

The relocalisation process is triggered whenever tracking is lost. Even though the localisation system is able to produce accurate motion estimates in the surroundings of a previously built map, inevitably the tracking can sometimes get lost. This may be caused by several factors—for example, kidnapping, motion blur, or textureless scenes where feature extraction fails. When tracking is lost, the system enters in the initialisation phase until a good relocalisation with respect to the previously built map is found.

Optionally, if the mobile device 100 comprises a satellite positioning receiver, a position estimate derived using satellite positioning signals may be used to assist the relocalisation.

Pose Estimation for Subsequent Frames After Relocalisation

Once a first pose has been obtained, we use this pose (alongside initial speed and sensor-bias estimates) to exploit the IMU inertial data to guide the estimation of pose for subsequent frames. The system can use prior values for the initial speed and sensor-biases or we can estimate these values more precisely in a calibration process that combines visual and IMU measurements. The method of calibrating the inertial data may vary depending on the configuration of the IMU—for example, depending on which sensors it contains and the expected biases of those sensors. Calibration information may also be derived from other, external sources. For example, for a wheeled vehicle or robot, initial speed information may be provided by a wheel-rotation sensor of the vehicle/robot. Meanwhile, if the mobile device has a satellite positioning receiver, initial speed information may be provided based on Doppler measurements of the satellite positioning signals.

Once the system is relocalised with respect to the global map, we use the visibility-prediction framework described above to compute a set of putative 3D-2D correspondences between the global map and the current frame. This means that, for a second frame, subsequent to the first frame mentioned above, the localisation is performed using a combination of visual and inertial data.

In step 810, the processor 140 calculates a predicted pose for the second image frame. This is done by extrapolating from the pose of a previous image frame—for example, the first image frame—using IMU measurements.

Given the predicted pose from the IMU measurements $x_{WS}$, the corresponding poses for each stereo camera $x_{WC_i}$ are computed by using the known extrinsics parameters between the IMU 130 and cameras 120.

Next, in step 830, the processor uses the visibility classifier (described above) to predict the likely visible 3D landmarks for each camera pose $x_{WC_i}$. To avoid matching landmarks that have a very small value for the posterior probability in Eq. 13, we use a visibility probability threshold $P_{vis}^{th}$ to filter landmarks with low visibility scores.

Optionally, if a position fix computed by satellite positioning is available, this can be used to assist the prediction of visible landmarks. Landmarks far from the position fix are unlikely to be visible in the current frame. This can be used to constrain the visibility prediction, potentially reducing the computational effort.

Figure 8:
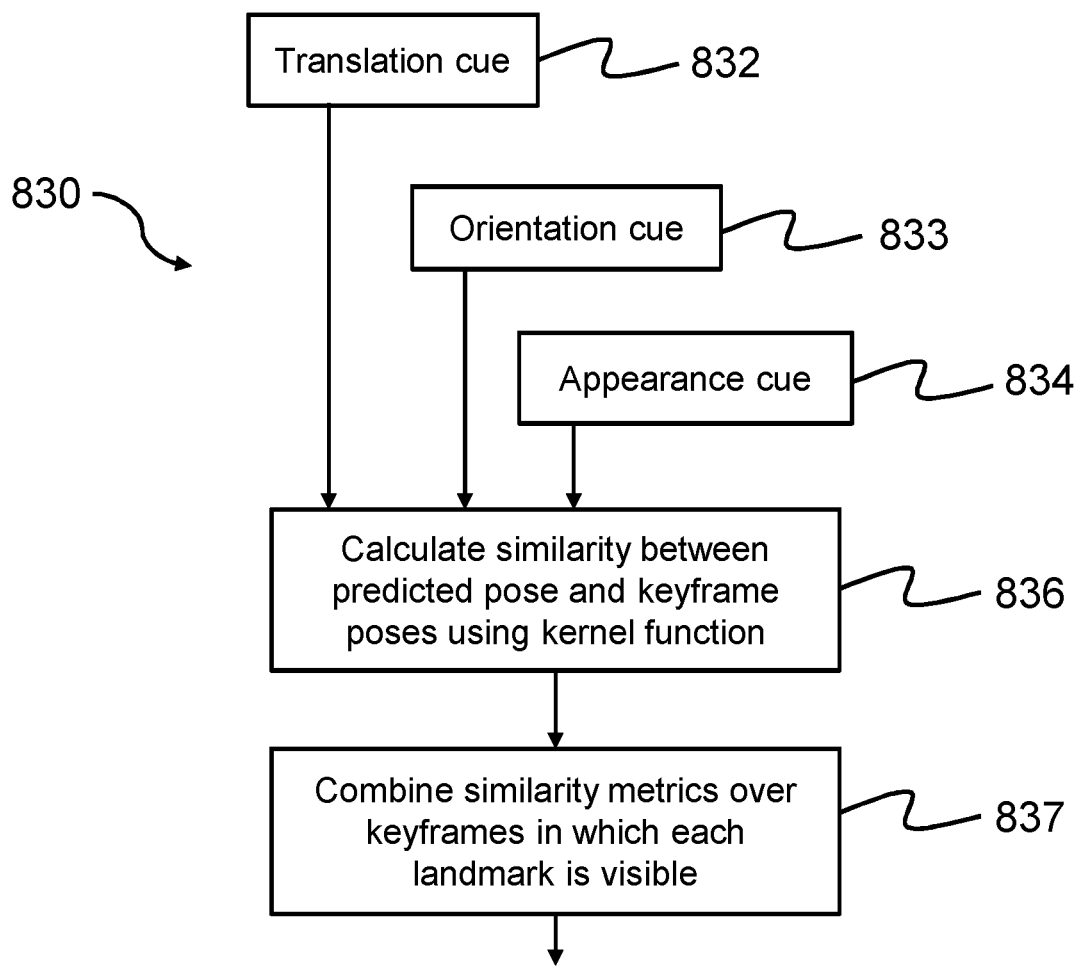
FIG. 8 illustrates an algorithm for predicting landmarks that are likely to be visible, in the method of FIG. 7.

FIG. 8 illustrates the visibility prediction 830 of Eq. (13) graphically. As described above, the kernel function incorporates a translation cue 832, an orientation cue 833, and an appearance cue 834. In step 836, the processor 140 calculates the similarity $k(x, x_i)$ between the IMU-based predicted pose and each of the K nearest poses among the keyframes. In step 837, the processor combines the similarity values, to predict the visibility of each landmark. This comprises, for each landmark, summing the similarity values of the set of keyframes containing that landmark. This is the summation in the numerator of Eq. (13). This is normalized by the sum of the kernel-similarity values of all of the K nearest neighbor—that is, the denominator in Eq. (13).

Figure 9:
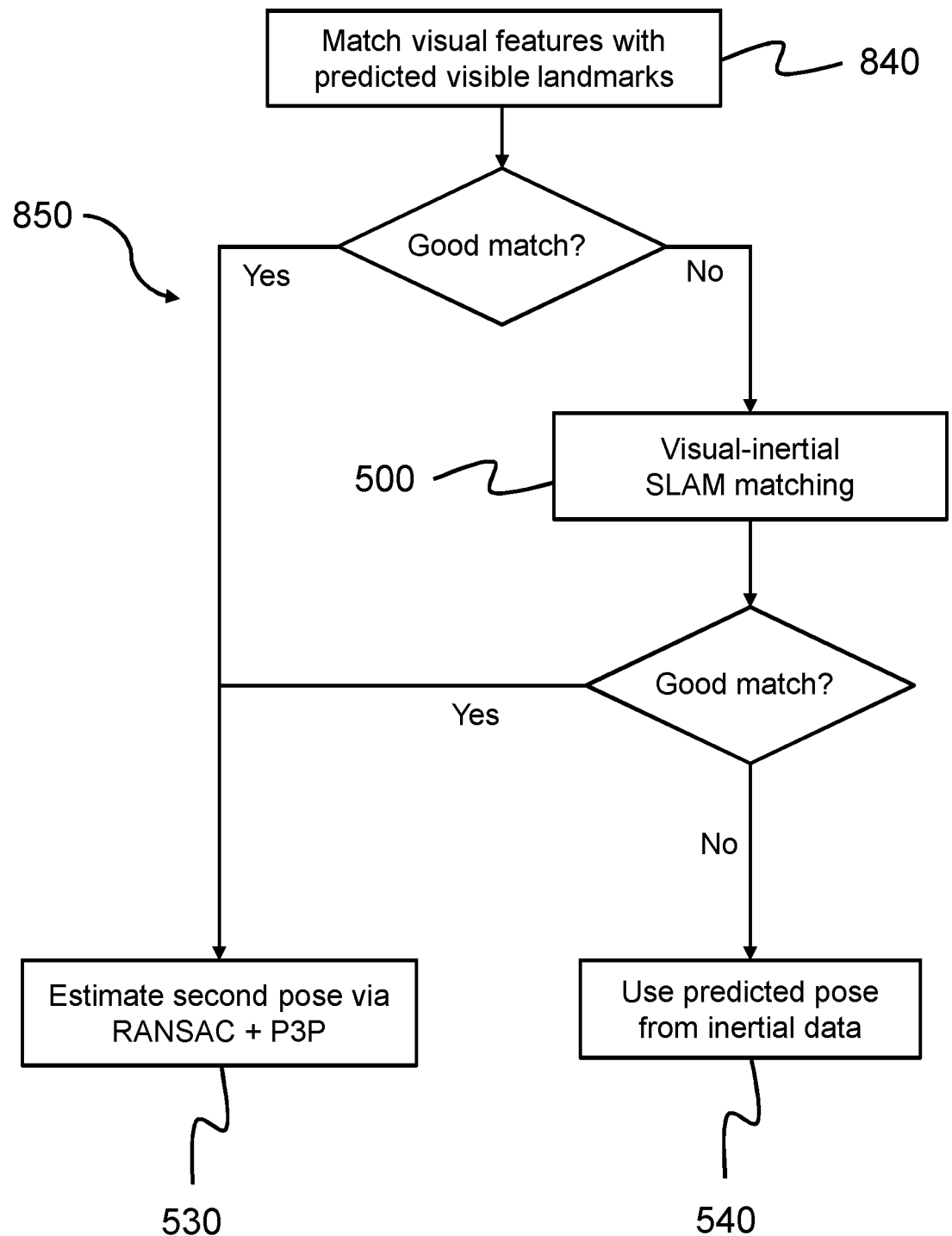
FIG. 9 is a flowchart illustrating an algorithm for calculating the second pose, in the method of FIG. 7.

FIGS. 7 and 9 together show the steps leading to the calculation of a second pose for the second image frame, in the localisation system.

In step 840, the visual features extracted in step 300 are matched with the landmarks that were predicted (in step 830) to be visible. In the present example, the predicted 3D landmarks are used to find 3D-2D correspondences using brute force matching. In other examples, guided matching could instead be used.

In step 850, the matched visual features and landmarks are used to calculate the second pose for the second image frame. This is illustrated in greater detail in FIG. 9.

If the matching in step 840 was successful, the set of putative correspondences from the existing map is fed into a RANSAC framework (step 530) to estimate an absolute pose by means of a P3P method for non-central cameras.

The initial estimate of the second pose is improved by minimising the reprojection error of the inlier correspondences.

For those cases in which the matching in step 840 is unsuccessful, the system falls back on the visual-inertial SLAM matching process 500, described above in the context of the first mode, in the section "Initial Pose Estimation". In this way, the mobile device 100 is able to work in new areas that were not captured in the previously built map. The matching process 500 proceeds by finding putative correspondences between two consecutive frames and estimating an absolute pose in a RANSAC-based framework (step 530). If it is not possible to find good correspondences, the propagated pose from the IMU is used as the second pose (step 540).

Local Map Tracking

Similarly to the process described above, illustrated in FIG. 4, local map tracking is performed. The inlier correspondences from the matching are added as observations into the backend and the refined initial pose is used to match (track) additional landmarks from the local map (step 644). The main difference from the map tracking in the first mode (SLAM mode) is that, for those error terms that contain observations from global map landmarks, the 3D landmarks are kept constant in the optimisation. In other words, only new landmarks from the current (localisation) session are adjusted—the "old" landmarks from the existing map are left unchanged. Similarly, landmarks are removed 646 if they are only visible in a small number of keyframes. This also applies only to landmarks from the current (localisation) session—landmarks from the existing map are left unchanged.

Keyframe Creation and Initialisation

The localisation mode uses a similar keyframe creation and initialisation strategy 600 as described above with reference to FIG. 5. In localisation-only mode, new keyframes from the current session are not added as part of the covisibility graph. However, they are used as keyframes in the sliding window estimator.

Sliding Window Visual-Inertial Estimator for Localisation

The second pose calculated in step 850 is refined in step 650. As described above, in the present example, this is achieved using bundle adjustment in a sliding window. As above, we keep only N keyframes and M frames, and perform marginalisation 680 of variables. When states need to be marginalised from the sliding window, all the error terms related to the variables to be marginalised are transformed into one linear error term that is added to the optimisation problem. For variables corresponding to the current (localisation-only) session, once they are marginalised they are completely removed from the system.

The method of FIG. 7 enables IMU measurements and visual data to be integrated to localise the mobile device 100 within an existing map. The method is suitable for real-time implementation on board the mobile device. This is achieved by seeking to focus the computational effort efficiently at each stage. For example, the use of the sliding window avoids the need to optimise over the full set of keyframes and frames. Likewise, the use of the predicted pose from the IMU helps to better target the computational effort in the matching step 840, by means of the visibility prediction in step 830.

Keyframe Selection

In both the first mode (SLAM mode) and the second mode (localisation mode) described above, the system selected new keyframes for initialisation 600 as a pose was calculated for each image frame. The criteria used in the selection process will now be described. The same criteria may be used in both modes.

Keyframe creation is an important step for building the map and also for guaranteeing good tracking quality throughout the whole environment. Keyframes refer to particular frames of interest within the sequence, which can be used to describe the mapped environment. In this way, keyframes also help to make the estimation problem tractable and bounded, since processing each single state in a bundle adjustment problem tends to be computationally expensive and may have large memory requirements.

Figure 10:
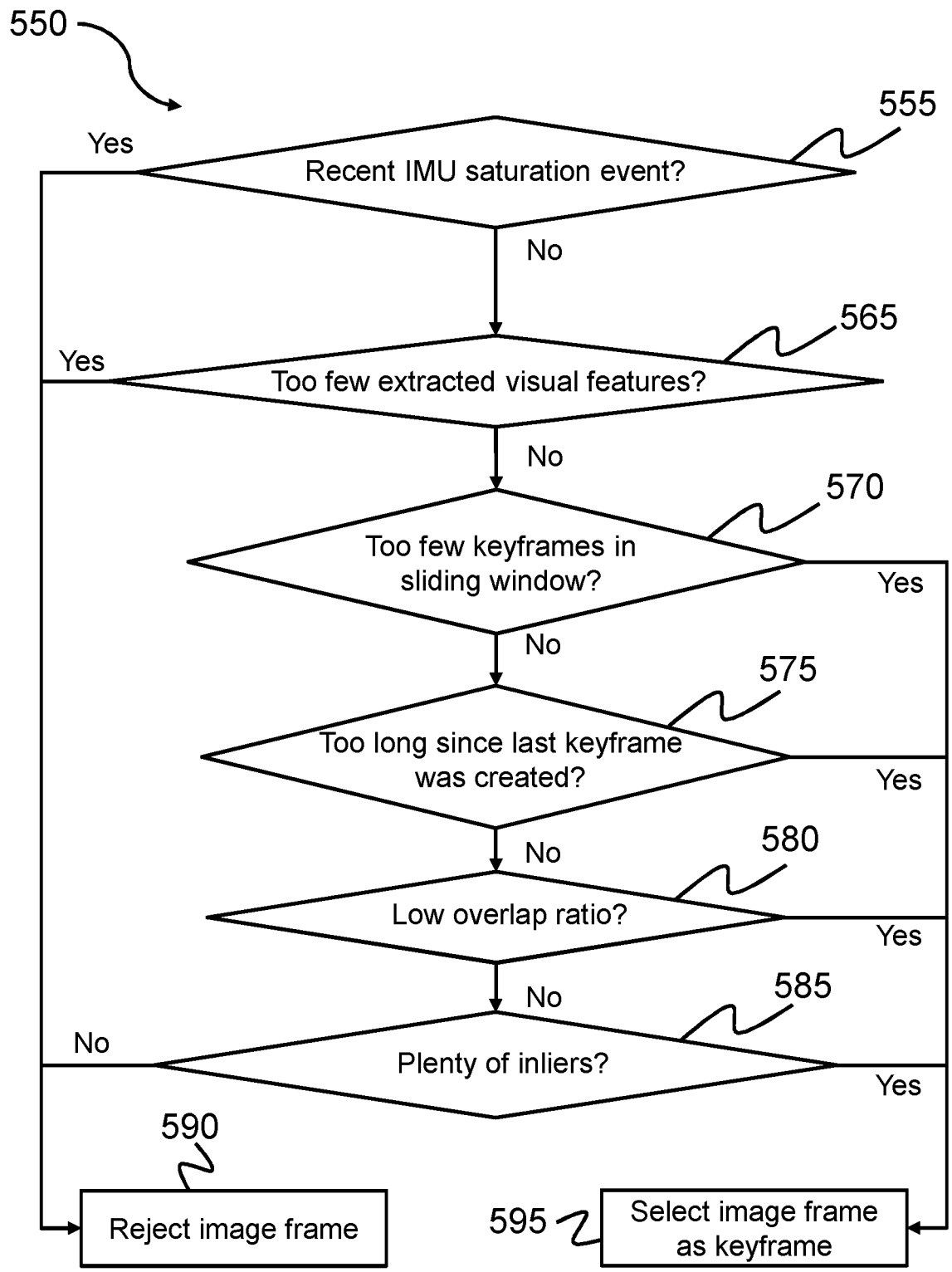
FIG. 10 illustrates a method for selecting an image frame for keyframe creation according to an example.

FIG. 10 is a flowchart illustrating a method of selecting frames to be keyframes, according to an example. This method can be applied to each current image frame, once a pose estimate is available. In particular, although not shown in FIG. 2 or FIG. 7, the method is implemented just before the step 600 of initialising a keyframe. In other words, image frames are first selected 550 to be keyframes, and then 600 initialised as keyframes. Consequently, it will be understood that, by the time the keyframe selection method is executed, the processor 140 of the mobile device 100 has already obtained 252 the visual data and obtained 254 the inertial data. It has also extracted 300 the visual features from the current image frame; matched 510 the extracted visual features with landmarks of at least one existing keyframe; and estimated 530 the pose of the current frame. (If matching fails completely, and the predicted pose is based solely on inertial data, there is no keyframe selection or initialisation.)

The selecting 550 of an image frame to be a keyframe is based on the evaluation of a number of criteria, in a particular sequence. It will be understood that the sequence illustrated in FIG. 10 is exemplary and other sequences (and some alternative or additional criteria) may be used instead. Nevertheless, the set of criteria and sequence of evaluation illustrated in FIG. 10 have been found to produce good results.

The method begins with step 555. In step 555, the processor detects whether there has been a saturation event in the inertial data, recently. In particular, if there has been an IMU saturation event (accelerometer or gyroscope), the processor waits at least 15 frames before initialising any new keyframes into the system. In this way, the system avoids inserting keyframes very close to IMU saturation events where the tracking may be unstable due to motion blur. In other words, for image frames captured during a first time interval after a saturation event, the image frames are rejected 590 by the keyframe selection process. In this example, the first time interval is defined as frames.

If there have been no IMU saturation events, or if a time period longer that the first time interval has elapsed since the most recent IMU saturation event, then the image frame is not rejected, and the processor proceeds to step 565. In this step, the processor checks the number of visual features that were extracted from the current image frame in step 300. A frame needs to have a minimum number of 2D detections to be considered suitable as a keyframe. If the number of visual features extracted is below a threshold number, the processor rejects 590 the image frame. (This threshold number will be referred to as the "fourth threshold".) In the present example it is set to 20 detected feature points.

If the number of extracted features is sufficient, then the image frame is not rejected and the processor proceeds to step 570. In this step, the processor evaluates whether there are enough keyframes for the sliding window estimator 650. The sliding window is defined in part by having a set number of keyframes (namely, 3 keyframes, in the examples above). However, immediately after initialisation of the system, there will be no keyframes. In step 570, the current image frame is selected 595 for initialisation as a keyframe as long as there are fewer than the required number of keyframes in the sliding window. (This required number will be referred to as the "first threshold".)

If there is already a sufficient number of keyframes in the sliding window, then the current frame is not (yet) selected as a keyframe, and the processor proceeds to step 575. In step 575, the processor evaluates the time difference between the current image frame and the previous keyframe. If this is larger than a second time interval, then the current image frame is selected 595 to be a keyframe. This promotes better tracking stability, since the covariance of pre-integrated IMU measurements will grow with longer time differences between consecutive keyframes. In the present example, the second time interval is set to 3 seconds.

Figure 11:
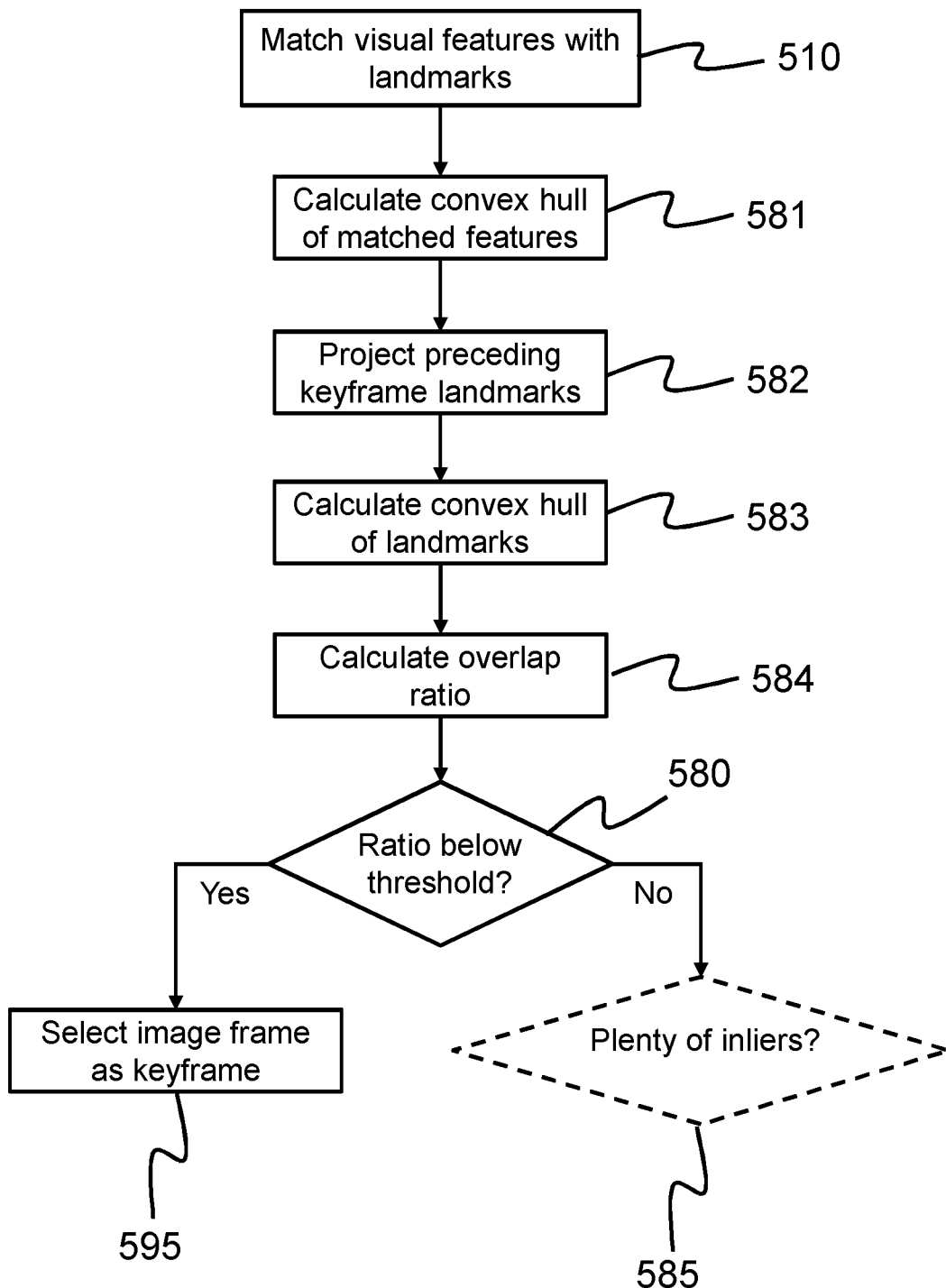
FIG. 11 is a flowchart illustrating a method for comparing a current image frame with an existing keyframe, to assist in deciding whether to select the current image frame as a new keyframe.

If the time since the preceding keyframe is less than the second time interval, then the current image frame is not (yet) selected as a keyframe, and the processor proceeds to step 580. In step 580, the processor compares extracted visual features of the current image frame with the landmarks of the preceding keyframe. This is illustrated in greater detail in FIG. 11.

The visual features extracted from the current image frame will already have been matched with the landmarks of at least one previous keyframe (for example, in step 510 of FIG. 3). In step, 581, the processor calculates the 2-D convex hull of the matched visual features in the current image frame—in other words, it calculates the convex hull of those visual features that were extracted from the current image frame and have been matched with respective landmarks in the previous keyframe. Extracted visual features that did not match with landmarks are ignored. In step 582, the processor projects the landmarks of the previous keyframe into the current image frame. This is done based on the relationship between the pose estimate for the current image frame and the pose of the keyframe. Next, in step 583, the processor calculates the 2-D convex hull of the projected landmarks in the current image frame. Then, in step 584, the processor calculates the area of overlap between the two convex hulls, and the overlap ratio. The overlap ratio is defined as the area of overlap divided by the area of the convex hull of the projected landmarks. In step 580, the processor checks whether the overlap ratio is below a threshold (for example 90%). If so, the current image frame is selected 595 to become a keyframe. If not, the method proceeds to step 585. Evaluating the overlap ratio in this way can allow the system to cope robustly with changes in viewpoint, while avoiding creating unnecessary additional keyframes. (The threshold against which the overlap ratio is evaluated will be referred to as the "fifth threshold".)

Figure 12:
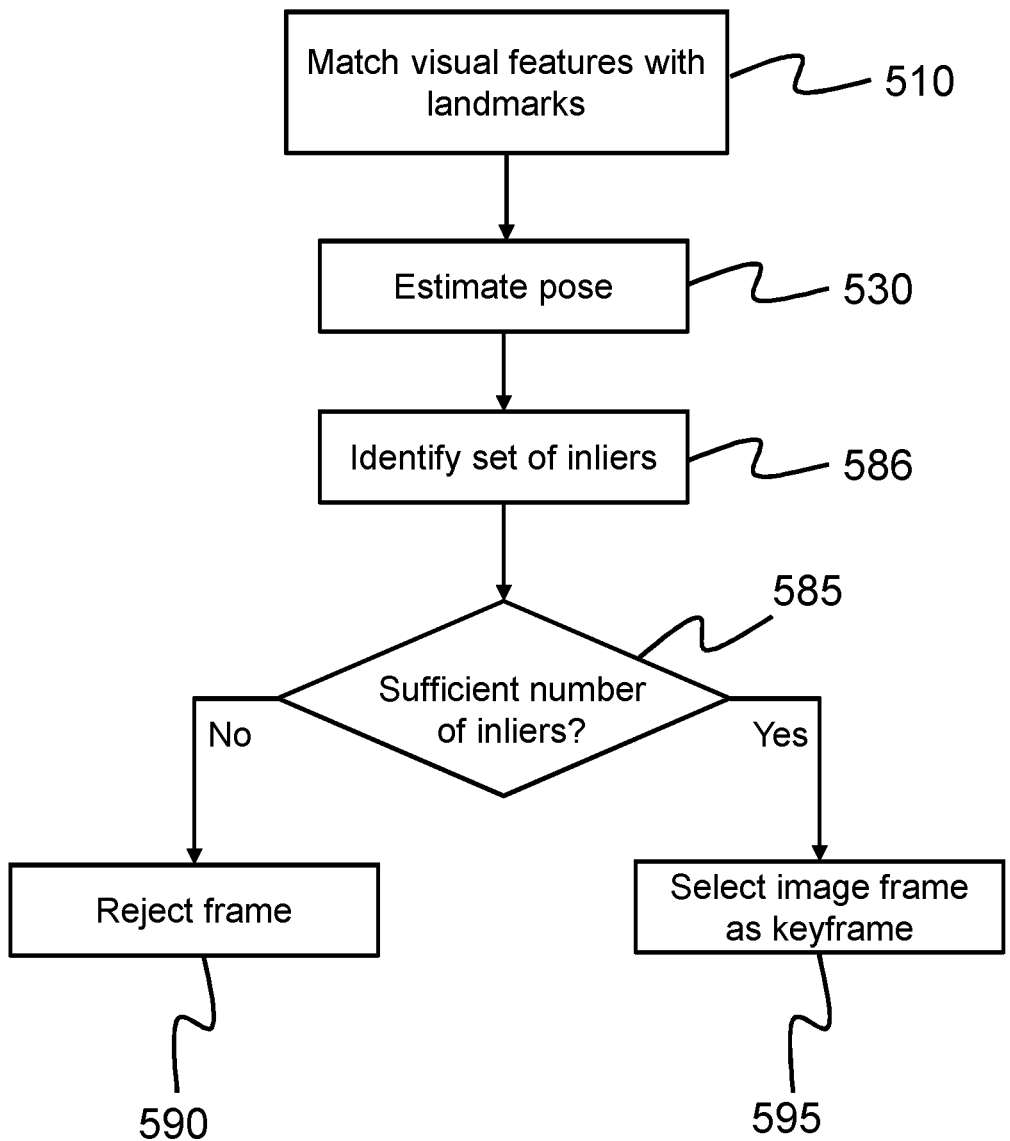
FIG. 12 is a flowchart illustrating a method for evaluating a number of inliers.

In step 585, the processor determines whether there were enough inliers after pose estimation for the current image frame. This is illustrated in greater detail in FIG. 12. As noted already, matching has already been carried out, between the visual features of the current image frame and the landmarks of at least one previous keyframe (for example, in step 510). Furthermore, a pose estimate is already available for the current image frame (for example, from step 530). In step 586, the processor identifies the set of inliers following the pose estimation process—that is, the set of matched feature points that are consistent with the pose estimate. The "consistency" with the pose estimate may be determined by calculating how far each matched extracted feature deviates from its position as predicted by the pose estimate. Features that deviate by less than an error threshold are deemed to be inliers. In step 585, the processor determines whether the number of inliers is less than a threshold—in this example, 21. If so, the image frame is rejected 590. Otherwise (for example, if there are 21 or more inliers), the image frame is selected 595 to be a keyframe. (The threshold on the minimum number of inliers will be referred to as the "sixth threshold".)

Figure 13:
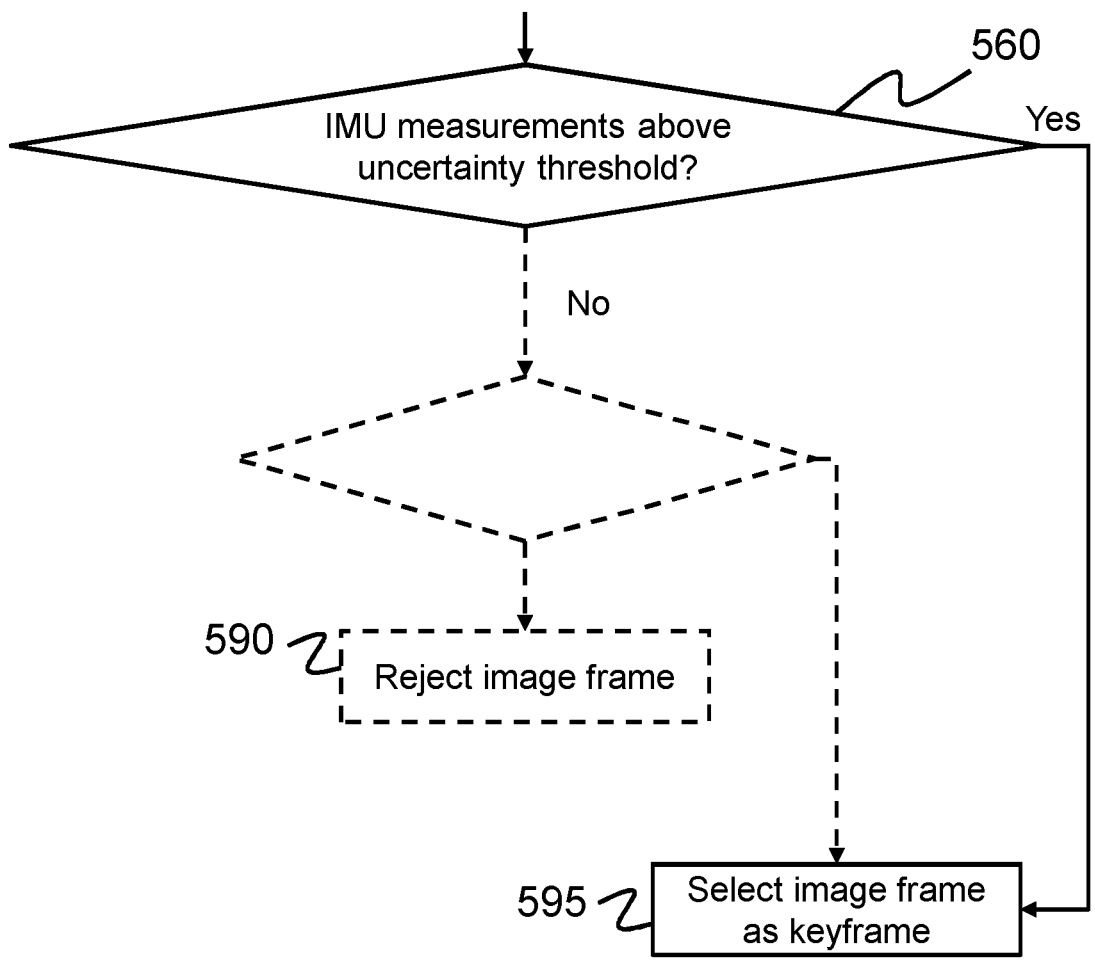
FIG. 13 illustrates an additional criterion for selecting key frames.

FIG. 13 shows an additional criterion that may be useful for selecting keyframes. In step 560, the processor evaluates whether a measure of uncertainty for the IMU measurements is above a threshold. If so, the processor selects 595 the current image frame to be a keyframe. In the present example, the measure of uncertainty comprises an error covariance of the inertial data. Inertial data tends to be unreliable over long time periods, because IMU errors are integrated over time. When the error covariance grows too large, it indicates that it is time to create a new keyframe—effectively recalibrating the IMU measurements. If, in step 560, the IMU measurements are not above the uncertainty threshold, then there is no urgent need to create a new keyframe. The processor may continue to evaluate other criteria, or may determine that the current image frame is to be rejected 590 as a keyframe.

Figure 14:
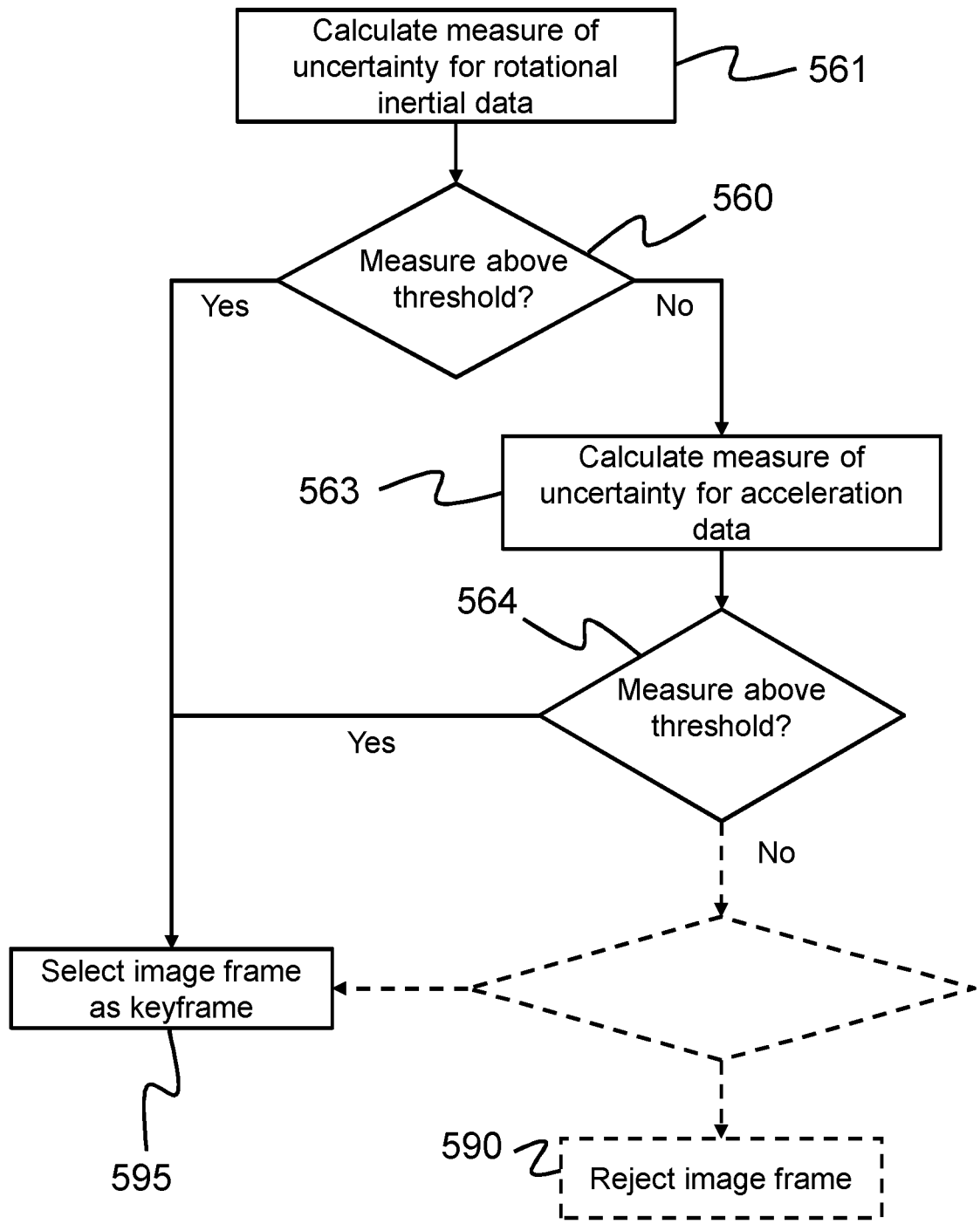
FIG. 14 illustrates the method of FIG. 13 in greater detail.

FIG. 14 illustrates one exemplary implementation of FIG. 13, in greater detail. In step 561, the processor calculates a measure of uncertainty for the rotational inertial data—for example, for the inertial measurements from the gyroscope. In step 560, the processor compares the rotational uncertainty measure against a rotational uncertainty threshold. If the rotational uncertainty measure is above the rotational uncertainty threshold, the processor selects 595 the current image frame as a keyframe. Otherwise, the processor proceeds to calculate a measure of uncertainty for the acceleration data, in step 563. In step 564, the processor compares this against an acceleration uncertainty threshold. If the measure is above the threshold, the processor selects 595 the current image frame as a keyframe. Otherwise, the processor can either continue to evaluate other criteria, or it can reject 590 the current image frame as a keyframe.

The rotational uncertainty threshold is an example of what will be referred to as the "second threshold"; the acceleration uncertainty threshold will be referred to as the "third threshold".

The criteria of FIGS. 13-14 can be used in addition to the criteria of FIG. 10, or in place of any of those criteria. In particular, it may make sense to replace the criterion of step 575 with the criterion of step 560/564. This is because the length of time since the last keyframe, in step 575, effectively acts as a proxy estimate for the uncertainty of the IMU measurements. By examining one or more actual measures of uncertainty of the inertial data, the system can distinguish between situations in which the uncertainty grows more slowly and those in which it grows more quickly (rather than assuming that it grows at a constant rate, which is effectively the underlying assumption in step 575).

The memory 110 may store one or more computer programs (or software or code) and/or data. The computer programs may include an operating system for the processor 140 to execute in order for the mobile device 100 to function. The computer programs may include computer programs according to embodiments of the invention or computer programs that, when executed by the processor 140, cause the processor 140 to carry out a method according to an embodiment of the invention. The computer programs may be stored in a non-transitory computer-readable storage medium as well as, or instead of, the memory 110.

The processor 140 may be any data processing unit suitable for executing one or more computer readable program instructions, such as those belonging to computer programs stored in the computer-readable storage medium and/or the memory 110. The processor 140 may comprise a single data processing unit or multiple data processing units operating in parallel or in cooperation with each other. The processor 140 may, as part of the execution of one or more computer readable program instructions, store data to and/or read data from the computer-readable storage medium and/or the memory 110.

It should be noted that the above-mentioned embodiments illustrate, rather than limit, the invention, and that those skilled in the art will be able to design many alternative embodiments without departing from the scope of the appended claims. For example, the stereo camera pair 120 may be replaced by a single camera, or by a multi-camera rig (for example, providing an omnidirectional view of the environment).

In the examples described above, A-KAZE features were used with M-LDB descriptors, to extract and characterise the visual features (and landmarks). However, it will be appreciated that other combinations of detectors and descriptors can be used. The descriptors may be binary descriptors, like the M-LDB descriptor, but this is not essential.

Other suitable algorithms for feature detection, description, and matching include but are not limited to: the Scale Invariant Feature Transform (SIFT); and Binary Robust Invariant Scalable Keypoints (BRISK) algorithm. Features may also be detected using a corner detector such as the Harris corner detector. These algorithms will be well-known to those skilled in the art. In general, any (human—) hand-crafted or (machine—learned features could be used for the visual features/landmarks. Nevertheless, in general it may be advantageous for the descriptions to be rotation invariant. As mentioned previously, this can be achieved by calculating a descriptor based on an estimate of the gravity direction, from the IMU.

Comparisons may be made between descriptors using any suitable distance metric. For example, a similarity-based distance threshold may be used for matching descriptors (whether binary or not). In the examples described above, a Bag of (binary) Words representation was used to characterise the keyframes and new image frames. Alternatively or in addition, another way of characterising and comparing image frames could be used. The appropriate comparison metric may depend on the type of descriptor used to characterise the individual landmarks/visual features. A visual vocabulary based on the BoW representation has been found to work well for binary descriptors, for example.

Other suitable representations include but are not limited to: the Vector of Locally Aggregated Descriptors (VLAD) (see Relja Arandjelovic and Andrew Zisserman "All About VLAD", Proceedings of the IEEE Conference on Computer Vision and Pattern Recognition (CVPR), 2013, pp. 1578-1585); and the vocabulary tree (see David Nister and Henrik Stewenius, "Scalable Recognition with a Vocabulary Tree", CVPR 2006: Proceedings of the 2006 IEEE Computer Society Conference on Computer Vision and Pattern Recognition—Volume 2, June 2006, Pages 2161-2168).

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to some advantage. Furthermore in the appended claims lists comprising "at least one of: A; B; and C" should be interpreted as (A and/or B) and/or C.

Furthermore in general, the various embodiments may be implemented in hardware or special purpose circuits, software, logic, or any combination thereof. For example, some aspects may be implemented in hardware, while other aspects may be implemented in firmware or software which may be executed by a controller, microprocessor, or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks, and functions, or a combination of program steps and logic circuits, blocks, and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory, and removable memory. The data processors may be of any type suitable to the local technical environment, and may include one or more of general purpose computers, special purpose computers, microprocessors, digital signal processors (DSPs), application-specific integrated circuits (ASIC), gate level circuits, and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The invention claimed is:

1. A computer-implemented method for localisation of a mobile device in an existing map of a 3-D environment, based on visual and inertial data generated at the mobile device, the method comprising:
   obtaining the existing map, the map comprising a set of keyframes characterising the environment, each keyframe having associated with it a plurality of landmarks, each landmark being a detected visual feature that is present in two or more keyframes and each landmark defining a 3-D position for the respective visual feature;

obtaining the visual data, comprising a series of image frames captured by a camera of the mobile device;

obtaining the inertial data, comprising at least one or any combination of two or more of:

accelerometer, gyroscope and compass measurements;

extracting visual features from each image frame in the series of image frames;

for a first image frame in the series of image frames, independently of the inertial data, localising a respective first pose of the mobile device, comprising comparing the extracted visual features of the first image frame with the landmarks associated with the keyframes from the existing map;

for a second, later image frame in the series of image frames:

calculating a predicted pose based on the first pose and the inertial data, based on the predicted pose, predicting a subset of the landmarks from the existing map that are likely to be visible in the second image frame, matching the extracted visual features of the second image frame with the predicted subset of landmarks, to identify matched visual features; and calculating the second pose of the mobile device associated with the second image frame based on the matched visual features and the respective landmarks.

2. The method of claim 1, wherein the extracted visual features are multiscale features in a nonlinear scale.

3. The method of claim 1, wherein the extracted visual features and the landmarks are described using rotation- and scale-invariant descriptors, optionally binary descriptors.

4. The method of claim 3, wherein the descriptors are generated using a gravity direction derived from the inertial data.

5. The method of claim 1, wherein comparing the extracted visual features of the first image frame with the landmarks associated with the keyframes comprises converting the extracted visual features and the landmarks into a bag of words representation.

6. The method of claim 1, wherein each keyframe has a pose associated with it, and wherein predicting the subset of the landmarks that are likely to be visible comprises calculating a similarity metric between the predicted pose and the pose of each keyframe.

7. The method of claim 6, wherein the similarity metric is based on at least one or any combination of two or more of:

a translation cue that measures a translational difference in position between the respective poses;

an orientation cue that measures a difference in orientation between the respective poses; and an appearance cue that measures visual similarity between the image frames associated with the respective poses.

8. The method of claim 7, wherein the similarity metric comprises a kernel function that combines the translation cue, orientation cue, and appearance cue.

9. The method of claim 6, wherein a likelihood of a given landmark being visible in the image frame is predicted by a method comprising:

for each keyframe in which the given landmark is visible, calculating the similarity metric between the predicted pose and the pose of the keyframe; and combining the calculated similarity metrics over two or more keyframes in which the given landmark is visible.

10. The method of claim 1, wherein calculating the second pose comprises deriving at least one pose estimate by applying a perspective-3-point method to the matched visual features and respective landmarks.

11. The method of claim 1, wherein calculating the second pose comprises applying a random sample consensus algorithm.

12. The method of claim 1, further comprising initialising new keyframes from selected image frames of the series of image frames.

13. The method of claim 1, further comprising matching the extracted visual features of the second image frame with additional landmarks, comprising guided matching between the landmarks and visual features using the second pose.

14. The method of claim 1, further comprising removing landmarks that are observed in fewer than a predefined number of keyframes.

15. The method of claim 1, further comprising refining the second pose of the second image frame based on measurements associated with a sliding window comprising a first number of the most recent keyframes and a second number of the most recent frames.

16. The method of claim 15, further comprising removing measurements from the sliding window by performing a marginalisation of variables for those measurements.

17. The method of claim 15, wherein the refining comprises bundle adjustment, in which the 3-D positions of the landmarks from the existing map are held constant.

18. The method of claim 1, further comprising:

obtaining a position estimate based on satellite positioning signals; and (i) using the position estimate to assist in localising the first pose; and/or (ii) using the position estimate to assist in predicting the subset of landmarks likely to be visible.

19. A mobile device configured to localise its pose using the method of claim 1.

20. A non-transitory computer readable storage medium having stored on it a computer program comprising computer program code, that when executed by one or more physical computing devices cause the one or more physical computing devices to perform operations comprising:

obtaining an existing map of a 3-D environment, the map comprising a set of keyframes characterising the environment, each keyframe having associated with it a plurality of landmarks, each landmark being a detected visual feature that is present in two or more keyframes and each landmark defining a 3-D position for the respective visual feature;

obtaining visual data, comprising a series of image frames captured by a camera of a mobile device;

obtaining inertial data, comprising at least one or any combination of two or more of: accelerometer, gyroscope and compass measurements;

extracting visual features from each image frame in the series of image frames;

for a first image frame in the series of image frames, independently of the inertial data, localising a respective first pose of the mobile device, comprising comparing the extracted visual features of the first image frame with the landmarks associated with the keyframes from the existing map;

for a second, later image frame in the series of image frames:

calculating a predicted pose based on the first pose and the inertial data, based on the predicted pose, predicting a subset of the landmarks from the existing map that are likely to be visible in the second image frame, matching the extracted visual features of the second image frame with the predicted subset of landmarks, to identify matched visual features; and calculating the second pose of the mobile device associated with the second image frame based on the matched visual features and the respective landmarks.

21. A mobile device configured to localise itself in an existing map of a 3-D environment, based on visual and inertial data generated at the mobile device, the mobile device comprising:

a memory, for storing the existing map, the existing map comprising a set of keyframes characterising the 3-D environment, each keyframe having associated with it a plurality of landmarks, each landmark being a detected visual feature that is present in two or more keyframes and each landmark defining a 3-D position for the respective visual feature;

a camera, configured to capture the visual data comprising a series of image frames;

an inertial measurement unit, configured to generate the inertial data, wherein the inertial measurement unit comprises at least one or any combination of two or more of: an accelerometer, a gyroscope and a compass;

one or more processors, configured to:

extract visual features from each image frame in the series of image frames;

for a first image frame in the series of image frames, independently of the inertial data, localise a respective first pose of the mobile device, comprising comparing the extracted visual features of the first image frame with the landmarks associated with the keyframes from the existing map;

for a second, later image frame in the series of image frames:

calculate a predicted pose based on the first pose and the inertial data, based on the predicted pose, predict a subset of the landmarks from the existing map that are likely to be visible in the second image frame, match the extracted visual features of the second image frame with the predicted subset of landmarks, to identify matched visual features; and calculate the second pose of the mobile device associated with the second image frame based on the matched visual features and the respective landmarks.

22. The mobile device of claim 21, wherein the mobile device is comprised in a handheld device, robot, or a vehicle.

* * * * *